US012573950B2

(12) United States Patent
Lin

(10) Patent No.: US 12,573,950 B2
(45) Date of Patent: Mar. 10, 2026

(54) SWITCHING REGULATOR WITH A LOW-POWER SINGLE-RAIL ARCHITECTURE

(71) Applicant: Cypress Semiconductor Corporation, San Jose, CA (US)

(72) Inventor: Adrian Lin, Austin, TX (US)

(73) Assignee: Cypress Semiconductor Corporation, San Jose, CA (US)

( * ) Notice: Subject to any disclaimer, the term of this patent is extended or adjusted under 35 U.S.C. 154(b) by 377 days.

(21) Appl. No.: 18/307,598

(22) Filed: Apr. 26, 2023

(65) Prior Publication Data

US 2024/0364215 A1      Oct. 31, 2024

(51) Int. Cl.
*H02M 3/155* (2006.01)
*H02M 1/00* (2006.01)

(52) U.S. Cl.
CPC ......... *H02M 3/155* (2013.01); *H02M 1/0045* (2021.05)

(58) Field of Classification Search
CPC ............................ H02M 3/155; H02M 1/0045
See application file for complete search history.

(56) References Cited

U.S. PATENT DOCUMENTS

| | | | | |
|---|---|---|---|---|
| 9,740,225 | B1* | 8/2017 | Wong ...................... | G05F 1/468 |
| 2023/0009164 | A1* | 1/2023 | Georgievski ............ | G05F 1/575 |
| 2024/0295890 | A1* | 9/2024 | Lin ......................... | G05F 1/575 |
| 2024/0364217 | A1* | 10/2024 | Lin ........................ | H02M 3/157 |

* cited by examiner

*Primary Examiner* — Adolf D Berhane

(57) ABSTRACT

A single-rail switching regulator and method are provided. The switching regulator includes a split-rail reference generator coupled between a battery voltage ($V_{BAT}$) and ground, and including a floating-rail generator to generate a floating-rail reference voltage ($V_{SSHV\_REF}$), a fixed-rail generator to generate a fixed-rail reference voltage ($V_{DD\_REF}$), a current-sinking (I-sink) buffer to receive $V_{SSHV\_REF}$ and generate a floating-rail voltage on a floating-rail to power logic devices formed on an IC with the switching regulator, and a high-side switching transistor including a source and drain coupled between $V_{BAT}$ and ground, and a gate coupled to the floating-rail. The floating-rail reference generator is operable to generate a $V_{SSHV\_REF}$ equal to $V_{BAT}-1.8V$ for $V_{BAT}$ between 1.8 and 4.8V, and 0V for $V_{BAT}$ less than 1.8V. The switching regulator further includes a low drop out regulator operable to receive $V_{DD\_REF}$ and power digital devices formed on the IC using a fixed voltage.

18 Claims, 26 Drawing Sheets

<u>200</u>

*1400*

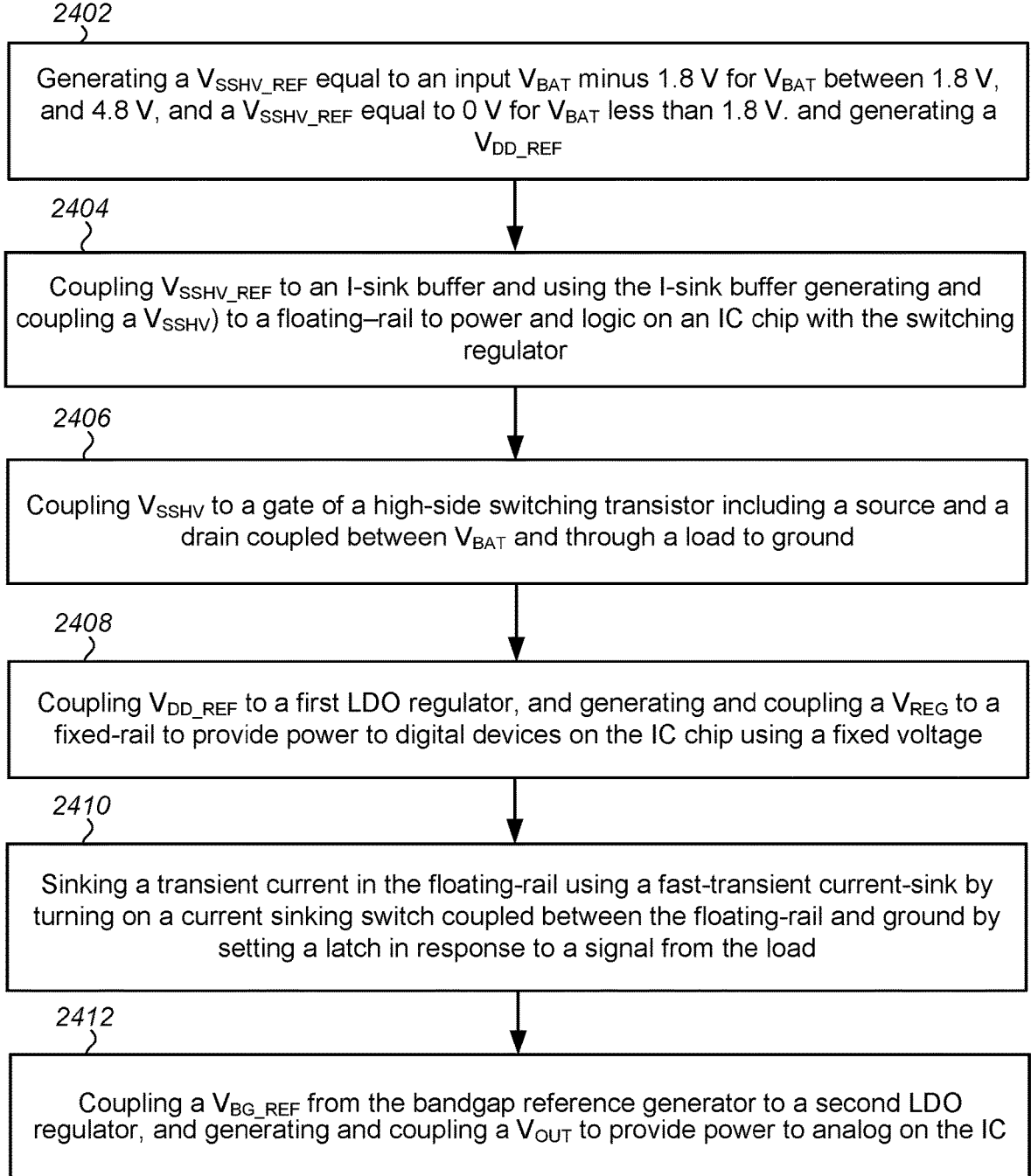

2402

Generating a $V_{SSHV\_REF}$ equal to an input $V_{BAT}$ minus 1.8 V for $V_{BAT}$ between 1.8 V, and 4.8 V, and a $V_{SSHV\_REF}$ equal to 0 V for $V_{BAT}$ less than 1.8 V. and generating a $V_{DD\_REF}$

2404

Coupling $V_{SSHV\_REF}$ to an I-sink buffer and using the I-sink buffer generating and coupling a $V_{SSHV}$) to a floating–rail to power and logic on an IC chip with the switching regulator

2406

Coupling $V_{SSHV}$ to a gate of a high-side switching transistor including a source and a drain coupled between $V_{BAT}$ and through a load to ground

2408

Coupling $V_{DD\_REF}$ to a first LDO regulator, and generating and coupling a $V_{REG}$ to a fixed-rail to provide power to digital devices on the IC chip using a fixed voltage

2410

Sinking a transient current in the floating-rail using a fast-transient current-sink by turning on a current sinking switch coupled between the floating-rail and ground by setting a latch in response to a signal from the load

2412

Coupling a $V_{BG\_REF}$ from the bandgap reference generator to a second LDO regulator, and generating and coupling a $V_{OUT}$ to provide power to analog on the IC

FIG. 24

SWITCHING REGULATOR WITH A LOW-POWER SINGLE-RAIL ARCHITECTURE

TECHNICAL FIELD

This present disclosure relates generally to switching regulators, and more particularly to switching regulators with a low-power, single-rail architecture and methods of operating the same.

BACKGROUND

Many electronic products, such as Bluetooth radios, automotive infotainment systems, and Wi-Fi hubs and receivers include microcontroller units (MCU) in which a processor unit, memory, and communication interfaces and peripherals are integrally formed with a power management unit (PMU) or switching regulator (SR) as a single integrated circuit (IC) or die The SR typically includes a high-side, switching transistor to provide stable, noise free DC voltage to analog, digital and logic devices in the IC. Previous generations of PMUs used a laterally-diffused p-channel metal-oxide semiconductor (LDPMOS) transistor with a 2.5 V gate oxide (GOx) as the high-side, switching transistor to provide continuous operation to digital and logic devices with 1.8 V GOx at battery voltages ranging from 1.6 V to 4.8 V. However, as semiconductor fabrication technologies shrink the size of metal-oxide semiconductor (MOS) devices to 28 nanometers (nm) or 22 nm and beyond, process limitations prevents the use of 2.5V GOx and 1.8V Gox devices in the same die, thus only 1.8V Gox devices are available to use for both the digital and logic devices of the MCU, and as power transistors or high-side, switching transistors in the PMU.

One shortcoming of the PMUs currently in production is that with only 1.8 V GOx devices available for use as the high-side, switching transistor the PMU must use a floating rail architecture to limit the voltage across the GOx of an LDPMOS to 1.8 V. However, state-of-the-art floating rail architectures limit operation to a minimum battery voltage of 2.7 V.

A further limitation in the current generation of PMUs is that the MCU requires a second, separate fixed rail to provide power to all standard and analog devices on the chip requiring a fixed 1.8 V. Currently there exists no internal PMU or system operating from a single battery supply, i.e., having a single-rail architecture, and capable of providing both a floating voltage to limit a gate-to-source voltage across the GOx of the LDPMOS and logic devices, and a separate, fixed voltage for other digital or 1.8 V devices available to address these requirements.

Accordingly, there is a need for a PMU or SR having an architecture capable of generating and maintaining a floating-rail voltage to a high-side, switching transistor or LPDMOS with a 1.8 V GOx, while allowing continuous operation at battery voltages ranging from 1.6V to 4.8 V. There is a further need for a PMU or SR having an architecture capable of providing from a single battery both the floating-rail voltage, and a constant voltage for other digital and analog devices formed on an IC with the PMU and requiring a fixed voltage.

SUMMARY

A single-rail switching regulator and method for operating the same are provided. The generator and method are particularly useful in power management units (PMU) or switching regulators (SR) including a high-side, switching transistor, such as a laterally-diffused p-channel metal-oxide semiconductor or LDPMOS.

The switching regulator includes a split-rail reference generator coupled between a battery voltage ($V_{BAT}$) and ground, and including a floating-rail generator to generate a floating-rail reference voltage ($V_{SSHV\_REF}$), a fixed-rail generator to generate a fixed-rail reference voltage ($V_{DD\_REF}$), a current-sinking (I-sink) buffer to receive $V_{SSHV\_REF}$ and generate a floating-rail voltage ($V_{SSHV}$) on a floating-rail to power logic devices formed on an integrated circuit (IC) with the switching regulator requiring or using $V_{SSHV}$, and a high-side switching transistor including a source and a drain coupled between $V_{BAT}$ and ground, and a gate coupled to the floating-rail. The floating-rail reference generator is operable to generate a $V_{SSHV\_REF}$ equal to $V_{BAT}$-1.8 V for battery voltages between 1.8 V and 4.8 V, and a $V_{SSHV\_REF}$ equal to 0 V for battery voltages less than 1.8 V.

Generally, the switching regulator further includes a low drop out (LDO) regulator and a dynamically-biased fast-transient current-sink coupled between $V_{BAT}$ and ground. The LDO regulator is operable to receive $V_{DD\_REF}$ and generate a regulated voltage ($V_{REG}$) on a fixed-rail to power digital devices formed on the IC and requiring or using a fixed voltage. The fast-transient current-sink is operable to receive $V_{SSHV\_REF}$ and to quickly charge and discharge the high-side switching transistor, to provide a stable floating-rail voltage ($V_{SSHV}$) on the floating-rail.

In some embodiments, the switching regulator further includes a bandgap reference generator and a second LDO regulator coupled between $V_{BAT}$ and ground, the second LDO regulator operable to receive a bandgap reference voltage ($V_{BG\_REF}$) and generate a constant output voltage ($V_{OUT}$) to provide power to analog devices integrally formed on the IC with the switching regulator, for $V_{BAT}$ between 1.8 V and 4.8 V.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS

Embodiments of the invention will now be described, by way of example only, with reference to the accompanying schematic drawings in which corresponding reference symbols indicate corresponding parts. Further, the accompanying drawings, which are incorporated herein and form part of the specification, illustrate embodiments of the present invention, and, together with the description, further serve to explain the principles of the invention and to enable a person skilled in the relevant art(s) to make and use the invention.

FIG. 24 is a flowchart illustrating a method for operating a low-power, single-rail switching regulator.

DETAILED DESCRIPTION

A low-power single-rail switching regulator and method for operating the same are provided. The switching regulator and methods of the present disclosure are particularly useful in portable and low-power applications such, as in a power management unit (PMU) or switching regulator (SR) for Bluetooth (BT) radios, Wi-Fi hubs or receivers, and other microcontroller units (MCU).

In the following description, for purposes of explanation, numerous specific details are set forth in order to provide a thorough understanding of the present invention. It will be evident, however, to one skilled in the art that the present invention can be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment. The term to 'couple' as used herein can include both to directly electrically connect two or more components or elements and to indirectly connect through one or more intervening components.

Figure 1:
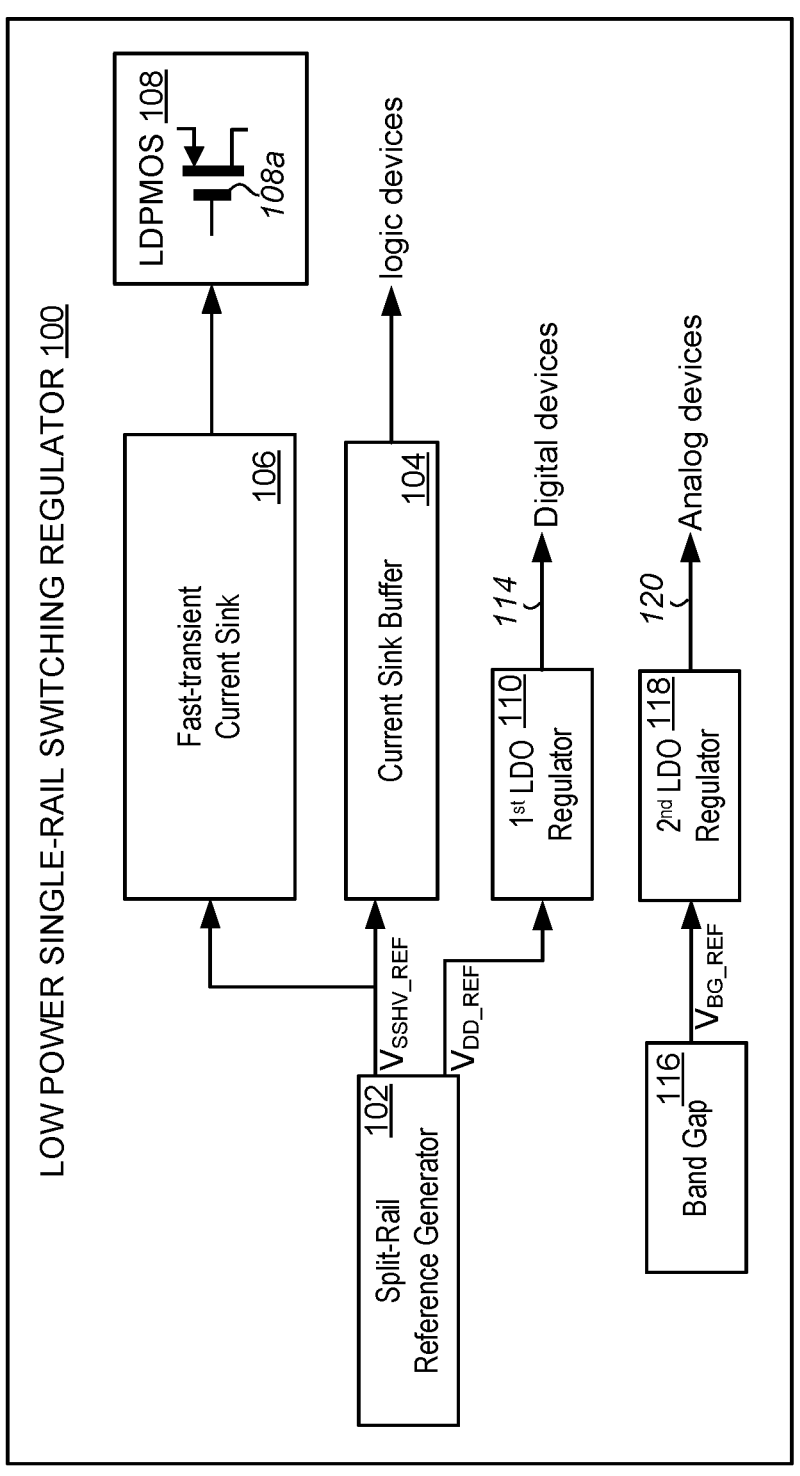
FIG. 1 is a block diagram of a low power, switching regulator (SR) with a single-rail architecture that is useful in a power management unit (PMU) including a high-side, switching transistor or LPDMOS with a 1.8 V GOx.

An embodiment of a switching regulator 100 having a single-rail architecture for use in or with a PMU will now be described with reference to FIG. 1 FIG. 1 is a block diagram of an embodiment of a switching regulator 100 including a number of separate modules or blocks, each of which can be used individually in general circuit applications, or integrated into a PMU having low-power consumption, while providing a stable floating-rail voltage ($V_{SSHV}$) over a battery voltage ($V_{BAT}$) ranging continuous from 1.6V to 4.8V.

Referring to FIG. 1, the switching regulator 100 generally includes a split-rail reference generator 102, a current-sinking (I-sink) buffer 104, a fast-transient current-sink 106, a high-side switching transistor, such as a laterally-diffused p-channel metal-oxide semiconductor (LDPMOS 108), and at least a first low drop out (LDO) regulator 110.

The split-rail reference generator 102 is coupled between a battery voltage ($V_{BAT}$) and ground, and is capable of simultaneously generating both a floating-rail reference voltage ($V_{SSHV\_REF}$) and a fixed-rail reference voltage ($V_{DD\_REF}$). Preferably, the split-rail reference generator 102 is generator is operable to generate a $V_{SSHV\_REF}$ equal to $V_{BAT}-1.8$ V for battery voltages between 1.8 V and 4.8 V, and a $V_{SSHV\_REF}$ equal to 0 V for battery voltages less than 1.8 V, and to generate fixed-rail a $V_{DD\_REF}$ of 1.8 V for battery voltages between 1.8 V and 4.8 V.

The I-sink buffer 104 is also coupled between $V_{BAT}$ and ground, and is operable to receive the $V_{SSHV\_REF}$ and generate a floating-rail voltage for logic devices such as inverters and level shifters.

The fast-transient current-sink 106 is likewise coupled between $V_{BAT}$ and ground, and is operable to receive $V_{SSHV\_REF}$ and to charge and discharge the high-side switching transistor (LDPMOS 108), to provide a stable floating-rail voltage ($V_{SSHV}$) on the floating-rail. Preferably, the fast-transient current-sink 106 is a low-power, fast-transient current-sink with dynamic biasing to reduce a quiescent current of the fast-transient current-sink when not charging or discharging the LDPMOS.

The first LDO regulator 110 is coupled between $V_{BAT}$ and ground, and is operable to receive $V_{DD\_REF}$ from the split-rail reference generator 102 and generate a regulated voltage ($V_{REG}$) on a first fixed-rail 114 to provide power to digital devices integrally formed on the IC chip and requiring a fixed voltage. By a fixed voltage it is meant a voltage that does not change relative to ground in contrast with the floating-rail voltage ($V_{SSHV}$), which can vary depending on the battery voltage. An exemplary fixed voltage required by the digital devices can be about 1.8 V.

In some embodiments, such as that shown in FIG. 1, the switching regulator 100 further includes a bandgap reference generator 116 and a second LDO regulator 118 operable to receive a bandgap reference voltage ($V_{BG\_REF}$) from the bandgap reference generator and generate an output voltage ($V_{OUT}$) on a second fixed-rail 120 to provide power to analog devices integrally formed on the IC with the switching regulator or a PMU or host system including the switching regulator. The output voltage ($V_{OUT}$) provided by the second LDO regulator 118 can be, for example, about 1.8 V.

An embodiment of a split-rail reference generator 200 including a floating-rail generator 202 operable to generate a floating-rail reference voltage ($V_{SSHV\_REF}$), and a constant-rail reference generator 204 operable to generate a fixed-rail reference voltage ($V_{DD\_REF}$) will now be described with reference to FIG. 2.

Figure 2:
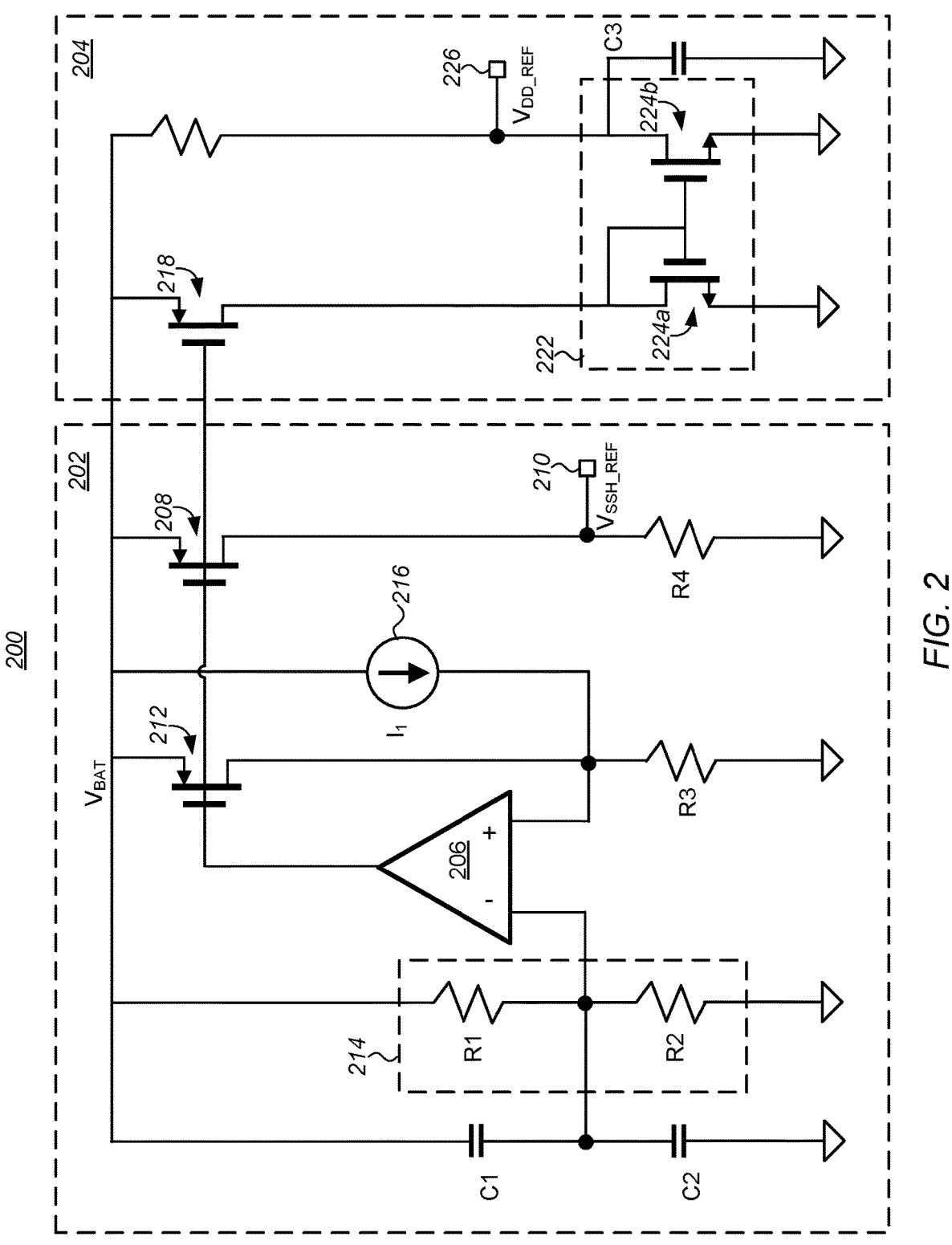
FIG. 2 is a schematic diagram of a split-rail reference generator according to an embodiment of the present disclosure.

Referring to FIG. 2, the floating-rail reference generator 202 includes a differential amplifier 206 having an output coupled to and operable to control gates of a pair of transistors. The pair of PMOS transistors include a first transistor 208 coupled between the input voltage ($V_{BAT}$) and a $V_{SSHV\_REF}$ output 210, and a second transistor 212.

Also, the differential amplifier 206 can be implemented using a one-stage differential operational amplifier (Opamp), and further includes an inverting input coupled to the input voltage ($V_{BAT}$) through a first resistor (R1) of a voltage divider 214 and to ground through a second resistor (R2) of the voltage divider, and a non-inverting input coupled to a drain of the second transistor 212 and to ground through a third resistor (R3). Capacitors C1 and C2 are coupled in series between $V_{BAT}$ and ground and in parallel with the first and second resistors (R1 and R2) of the voltage divider 214 to form a capacitive voltage divider to stabilize the voltage to the inverting input the differential amplifier 206.

The floating-rail reference voltage ($V_{SSHV\_REF}$) is generated across a fourth resistor (R4) coupled between the $V_{SSHV\_REF}$ output 210 and ground. In the embodiment shown, the floating-rail reference generator 202 yields a floating-rail reference voltage ($V_{SSHV\_REF}$) as shown in equation 1 below.

$$V_{SSHV\_REF} = \left(\frac{V_{BAT}}{k} - \frac{V_{GS}}{k}\right) \cdot \frac{1}{R} \cdot k \cdot R \tag{1}$$

where $V_{GS}$ is a preselected or desired constant potential difference between $V_{BAT}$ and $V_{SSHV\_REF}$, k is a voltage scaling ratio, and R is a resistance of the current scaling resistor. $V_{GS}$ represents a preselected maximum gate-source voltage for the fabrication process.

In this embodiment the $V_{GS}$ of equation 1 is the desired maximum gate-source voltage (selected to be 1.8V in a 22 nm process), the voltage scaling ratio (k) is equal to a resistance of the second resistor (R2) divided by a sum of resistances of the first resistor (R1) and second resistor (R2) or k=R2/(R1+R2), and a resistance of the fourth resistor (R4), or current scaling resistor, is equal to a product of the resistance of the second resistor (R2) and a resistance of the third resistor (R3) divided by a sum of resistances of the first resistor (R1) and second resistor (R2). Thus, the floating-rail reference voltage ($V_{SSHV\_REF}$) for the floating-rail reference generator 202 of FIG. 2 equals $V_{BAT}$−1.8 V for $V_{BAT}$ voltages between 1.8 V and 4.8 V, and $V_{SSHV\_REF}$ equals 0 V for $V_{BAT}$ less than 1.8 V. Additionally, it is noted that the floating-rail reference generator 202 is as low power floating-rail reference generator having a total current consumption less than about 100 nA.

In the embodiment shown, the floating-rail reference generator 202 further includes a current source 216 through which the third resistor (R3) is coupled to $V_{BAT}$ to set the non-inverting input to the differential amplifier 206. The current source is selected or operated to have a predetermined current ($I_1$) as shown in equation 2 below.

$$I_1 = \frac{V_{GS}}{kR} = V_{GS}\left(\frac{R_1 + R_2}{R_2 R_3}\right) \tag{2}$$

where $V_{GS}$ is a preselected or desired maximum gate-source voltage (selected to be 1.8V in a 22 nm process), $R_1$ is the resistance of the first resistor, $R_2$ is the resistance of the second resistor and $R_3$ is the resistance of the third resistor.

Referring again to FIG. 2, the constant-rail reference generator 204 includes a p-type or p-channel MOS (PMOS) transistor 218 coupled between $V_{BAT}$ and ground in a first leg, and in parallel with a series connected resistor 220 in a second leg. The PMOS transistor 218 has a gate coupled in parallel with the first and second transistors 208, 212, in the floating-rail reference generator 202 to function as a current source for the first leg of the constant-rail reference generator 204. The constant-rail reference generator 204 further includes a current sink 222 including first and second n-type or n-channel MOS transistor (NMOS 224a and 224b) configured to mirror current in the second leg with a current (in the first leg. The fixed-rail reference voltage ($V_{DD\_REF}$) is taken from a $V_{DD\_REF}$ output 226 between the resistor 220 and NMOS 224b. A capacitor (C3) coupled in parallel with NMOS 224b between the $V_{DD\_REF}$ output 226 and ground serves to stabilize $V_{DD\_REF}$.

In operation the output of differential amplifier 206 is coupled to the gate of PMOS transistor 218 to control the sink current through the current sink 222. Thus, the sink current through the NMOS 224b, and the voltage dropped across the resistor 220 will yield a $V_{DD\_REF}$ of 1.8 V for battery voltages between 1.8 V and 4.8 V. For battery voltages below 1.8 V the $V_{DD\_REF}$ is equal to the battery voltage.

Figure 3:
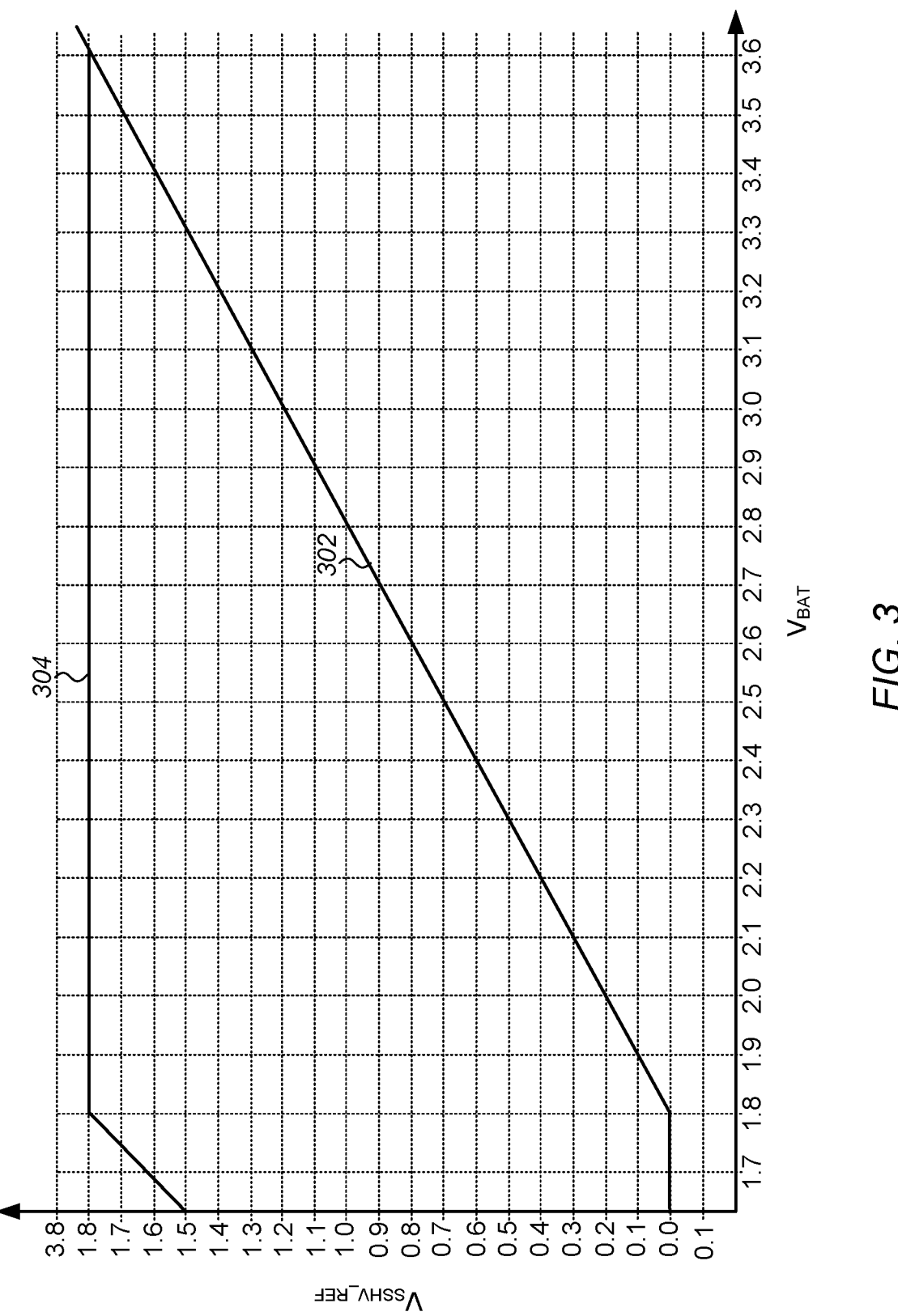
FIG. 3 is a graph of floating-rail reference voltage ($V_{SSHV\_REF}$) and a regulated, fixed-rail reference voltage ($V_{DD\_REF}$) versus battery voltage ($V_{BAT}$) for battery voltages from 1.6 V to 4.8 V.

FIG. 3 is a graph of floating-rail reference voltage ($V_{SSHV\_REF}$) and a regulated, fixed rail reference voltage ($V_{DD\_REF}$) versus battery voltage ($V_{BAT}$) illustrating the ability of the split-rail reference generator 200 of FIG. 2 to operate continuously with battery voltages from 1.6V to 4.8 V. In particular, it is noted that the floating-rail generator 202 of the split-rail reference generator 200 is operable to provide a stable V$_{SSHV\_REF}$ 302 of about 0 V for battery voltages from about 1.5V to about 1.8V, and steadily increasing V$_{SSHV\_REF}$ voltages equal to about V$_{BAT}$–1.8V at battery voltages from about 1.8V to about 4.8V. It is further noted that the constant-rail reference generator 204 of the split-rail reference generator 200 is operable to provide steadily increasing V$_{DD\_REF}$ 304 voltages equal to about V$_{BAT}$ at battery voltages from about 1.5V to about 1.8V, and a stable V$_{DD\_REF}$ of about 1.8 V for battery voltages from about 1.8V to about 4.8V.

Figure 4:
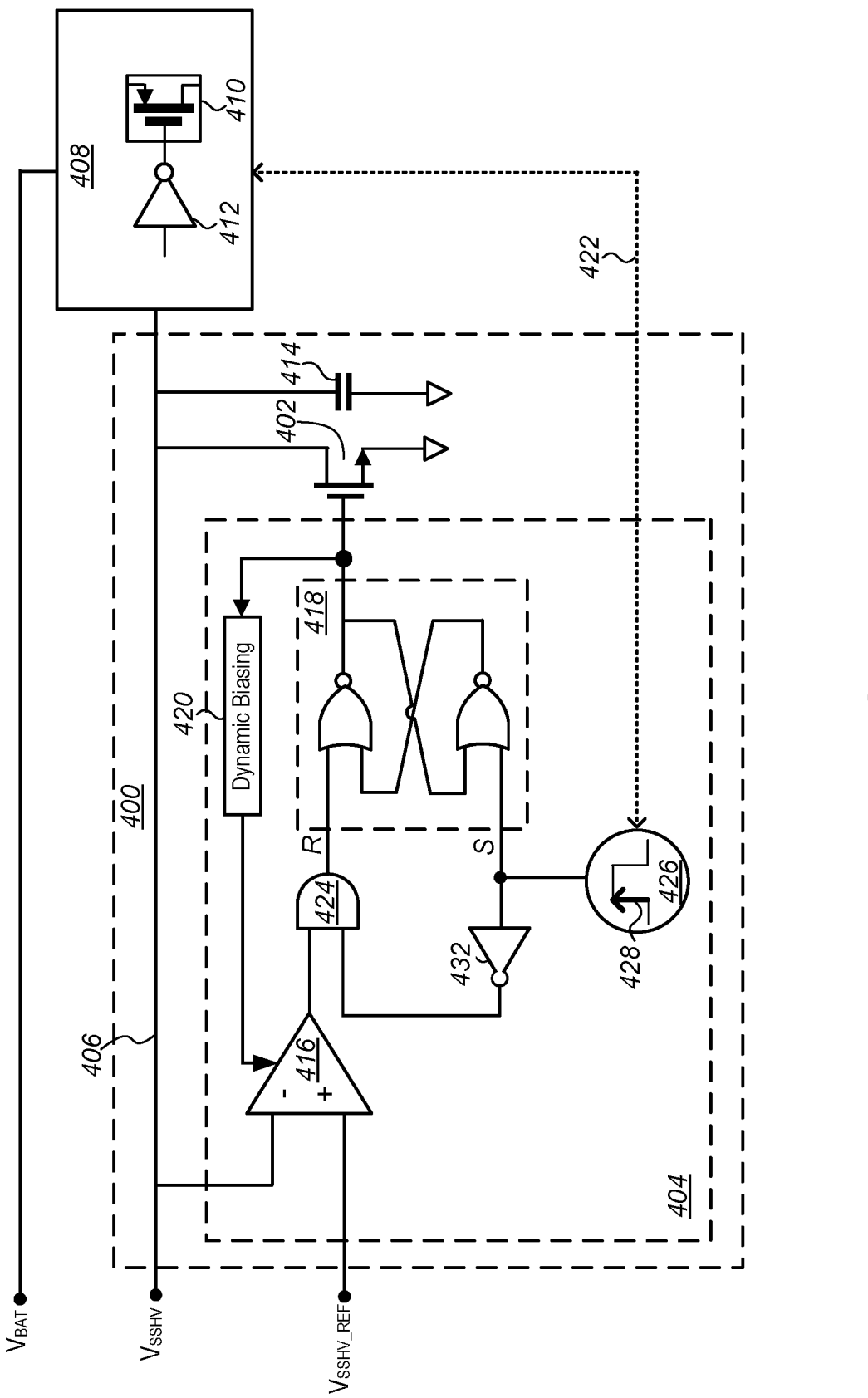
FIG. 4 is a schematic diagram of a low-power, fast-transient, large current-sink including a dynamic biasing circuit.

An embodiment of a current-sink 400 will now be described with reference to FIG. 4. FIG. 4 is a schematic block diagram of an embodiment of a current-sink 400. Referring to FIG. 4, the current-sink 400 generally includes a current sinking switch 402 and a dynamically controlled latch system 404. The latch system 404 has a first input **\*\*coupled to a floating-rail voltage (V$_{SSHV}$) on a floating-rail 406, a second input coupled to a floating-rail reference voltage (V$_{SSHV\_REF}$), and a latch system output coupled to a control gate of the current sinking switch 402. The current sinking switch 402 further includes, in addition to the control gate, a first source/drain (S/D) terminal coupled to the floating-rail 406 and a second S/D terminal coupled to ground, and is operable to sink at least a portion of a load current (I$_{LOAD}$) from a load 408 coupled between the floating-rail and a DC input voltage (V$_{BAT}$) to provide a stable V$_{SSHV}$. The load 408 can include a High-Side Switch transistor in a switching regulator (SR), which is represented in this figure by a laterally-diffused PMOS (LDPMOS) transistor 410 and an inverter 412**.

In some embodiments, such as that shown, the current-sink 400 further includes a sinking capacitor 414 coupled in parallel with the current sinking switch 402 between the floating-rail 406 and ground to sink large, fast-transients or spikes in load current.

Generally, as in the embodiment shown, the current sinking switch 402 is an n-type or n-channel MOS (NMOS) transistor.

The latch system 404 generally includes a comparator 416, a set-reset (S-R) latch 418 and a dynamic biasing circuit 420 coupled between an output of the S-R latch and the comparator. The comparator 416 has a non-inverting input coupled to V$_{SSHV\_REF}$, an inverting input coupled to the floating-rail 406, and a comparator output coupled through a first input of a logic-gate 424 to the S-R latch 418. The S-R latch 418 has a reset input (R) coupled through an output of the logic-gate 424 to the comparator, a set input (S) coupled to a pulse generator 426 operable to receive a transient load current signal 422 from the load 408 coupled to the floating-rail and output a pulse 428 to set the S-R latch 418 on a leading edge. The S-R latch 418 further includes a latch output coupled to the control gate of the current sinking switch 402.

In some embodiments, such as that shown, the logic-gate 424 is a two input AND gate and includes a second input coupled to the pulse generator 426. The pulse generator 426 has, in addition to an input coupled to and operable to receive the transient load current signal 422, a pulse generator 426 coupled to the set (S) input of the S-R latch 418, and an inverter 432 to the second input of the logic-gate 424. The inverted pulse applies a logic '0" to the second input of the logic-gate 424, thereby ensuring that any noise or glitch generated by dynamic biasing of the comparator 416 does not result in an erroneous reset signal to the S-R latch 418. After a predetermined time equal to a pulse width of the pulse 428, a logic '1' is applied to the second input of the logic-gate 424, thereby enabling a reset signal to be coupled from the comparator 416 to the reset (R) input of the S-R latch 418 when a difference between V$_{SSHV\_REF}$ and V$_{SSHV}$ is less than a predetermined voltage.

In response to the transient load current signal 422, the pulse generator 426 outputs from the pulse generator 426 a pulse having a logic '1' to the set input (S) of the S-R latch 418. This results in a logic high, or output of about 1.8V on the latch output, which is coupled to the gate of the current sinking switch 402 turning on the switch and connecting the floating-rail 406 to ground to sink at least a portion of the transient load current. The output pulse drives the input of the inverter 432 resulting in a pulse logic '0' being applied to the second input of the logic-gate 424. This momentarily suppresses a possible glitch from the comparator 416 applied to the reset input (R) of the S-R latch 418.

At substantially the same time a logic '1' on the output of the S-R latch 418 functions as a bias enable signal, causing the dynamic biasing circuit 420 to output one or more biasing voltages to bias inputs in the comparator 416 to output a logic high when V$_{SSHV}$ is greater than V$_{SSHV\_REF}$ by a predetermined amount. At substantially the same time a logic '1' on the output of the S-R latch 418 functions as a bias enable signal, causing the dynamic biasing circuit 420 to improve the comparator 416 response time and accuracy.

At substantially the same time a load current from load 408 begins to flow into node V$_{SSHV}$ which causes node V$_{SSHV}$ to rise above V$_{SSHV\_REF}$. This subsequently switches the comparator 416 from a marginally ON state to operating in a high-precision mode, forcing the comparator to output a logic '0' through the logic-gate 424 into the reset input (R) of the S-R latch 418. The S-R latch 418 output therefore remains high forcing the current sinking switch 402 to start sinking load current from node V$_{SSHV}$ to ground, which then causes V$_{SSHV}$ to eventually decrease below V$_{SSHV\_REF}$. When this condition occurs the dynamically biased comparator 416 asserts logic '1' thus the S-R latch 418 is reset and the current sinking switch 402 is turned-off.

Operation of the current-sink 400 in response to a transient in load current will now be described with reference to the graphs of FIGS. 9A through 9H.

Figure 5A:
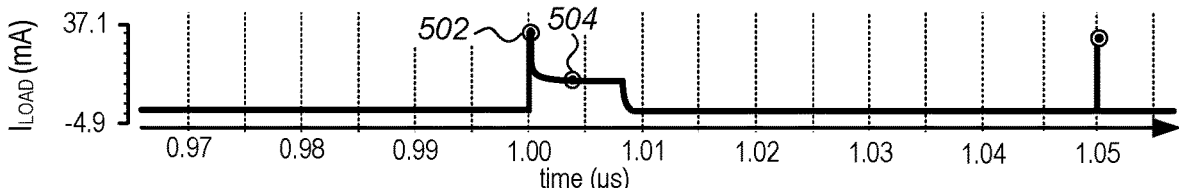
FIGS. 5A through 5H are graphs versus time of various current and voltage inputs to and resultant outputs from the current-sink of FIG. 4 during operation.

Referring to FIG. 5A, a transient in load current including a large load current spike 502 of 33.58 mA and a lower, steady load current 504 of 13.09 mA was generated on a gate of the LDPMOS transistor 410 coupled to the floating-rail 406 beginning at time of 1 μs.

Figure 5B:
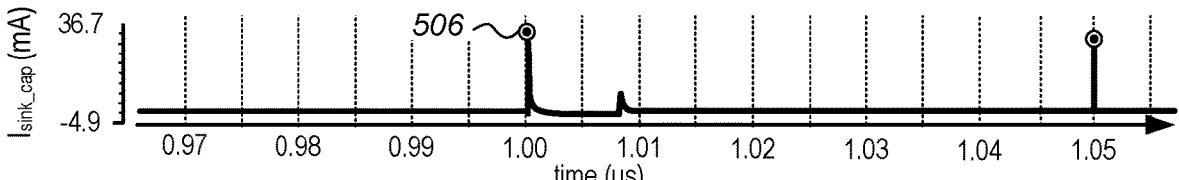

Referring to FIG. 5B the large load current spike 502 results in an immediate sinking current (I$_{sink\_cap}$ 506) through the capacitor 414 of 33.21 mA, substantially equal to the large load current spike 502 in the transient load current shown in FIG. 5A.

Figure 5C:
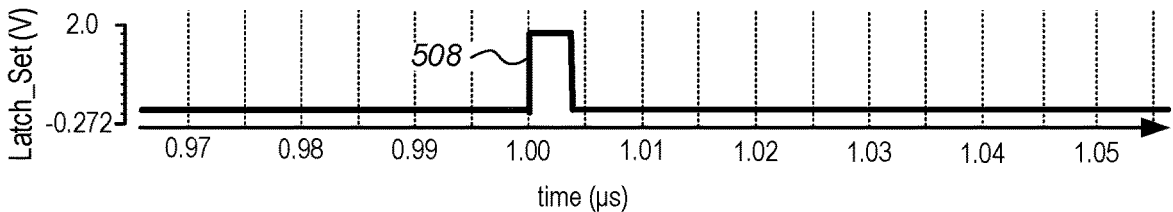

Referring to FIG. 5C, at substantially the same time a transient load current signal 422 from the load 408 causes the the pulse generator 426 to output a voltage (Latch_Set 508) of 1.8V to the set input of the S-R latch 418. Setting the S-R latch 418 results in a logic '1' on the output of the S-R latch 418 that functions both as a bias enable signal to enable the dynamic biasing circuit 420, and as a switch gate voltage to turn on the current sinking switch 402.

Figure 5D:
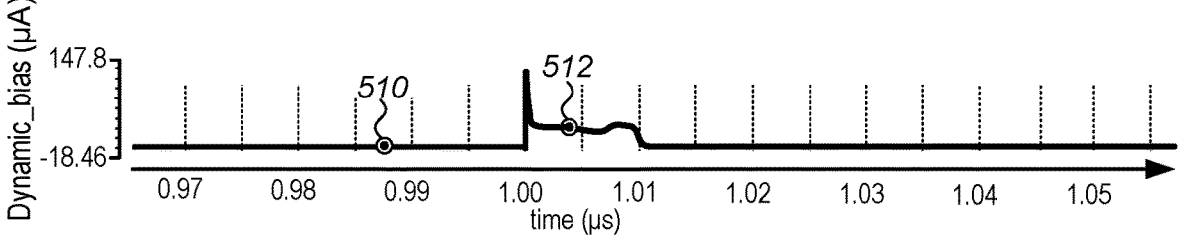

FIG. 5D illustrates the dynamic biasing current (Dynamic_bias) flowing in the dynamic biasing circuit 420 as it generates and couples one or more biasing voltages to bias inputs of the comparator 416. Referring to FIG. 5D it is noted that the dynamic biasing current increases a low initial current 510 of about 30 picoAmps (pA) to a steady current

512 of about 31.87 μA in less than 2 ns and remain high for the duration of the transient load current, shown here as about 10 ns.

Figure 5E:
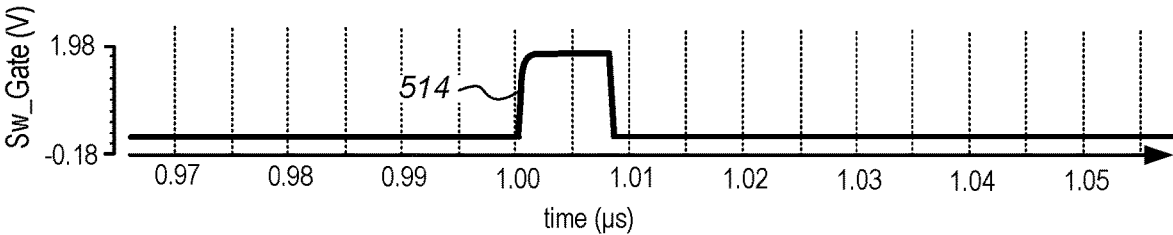

FIG. 5E illustrates the switch gate voltage (Sw_Gate 514) applied to the gate of the current sinking switch 402 from the output of the S-R latch 418. It is noted that the Sw_Gate 514 rises rapidly from an initial low voltage of about 0V to a steady c voltage of about 1.8V in less than 2 ns and remain high for the duration of the transient load current, shown here as about 10 ns.

Figure 5F:
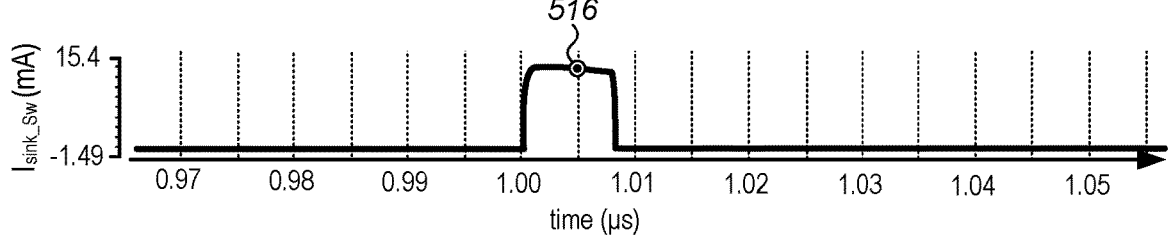

Referring to FIG. 5F it is noted that switching the current sinking switch 402 on results in a near immediate sinking current ($I_{sink\_Sw}$ 516) through the current sinking switch of about 13.70 mA, substantially equal to the steady load current 504 in the transient load current shown in FIG. 5A.

Figure 5G:
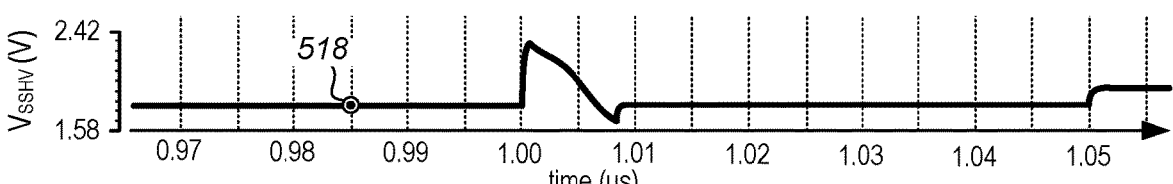

FIG. 5G illustrates the impact of the operation of the current-sink 400 in response to the transient load current on the floating-rail voltage ($V_{SSHV}$ 518). Referring to FIG. 5G it is noted that $V_{SSHV}$ starts at a low initial voltage of about 1.8V, increasing to about 2.4 at time 1 μs after which it begins rapidly decreasing, and settles back to about 1.8V after 9 ns at about time 1.009 μs.

Figure 5H:
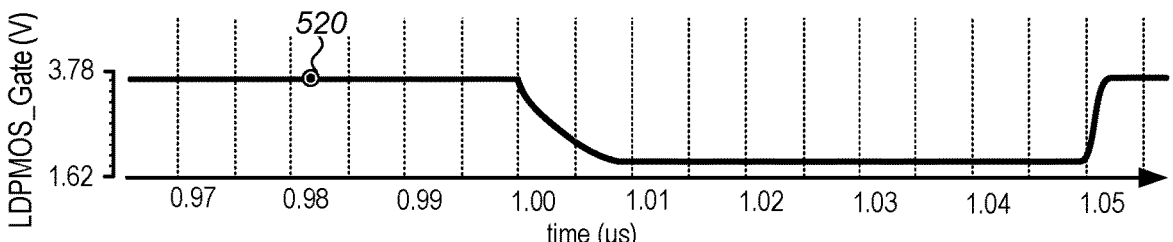

FIG. 5H illustrates the impact of the operation of the current-sink 400 in response to the transient load current on a gate voltage (LDPMOS_Gate 520) of the LDPMOS transistor 410. Referring to FIG. 5H it is noted that LDPMOS-_Gate 520 starts at an initial voltage of about 3.6V from which it begins rapidly decreasing beginning at time 1 μs to settle at a voltage of about 1.8V in about 8.2 ns.

Figure 6:
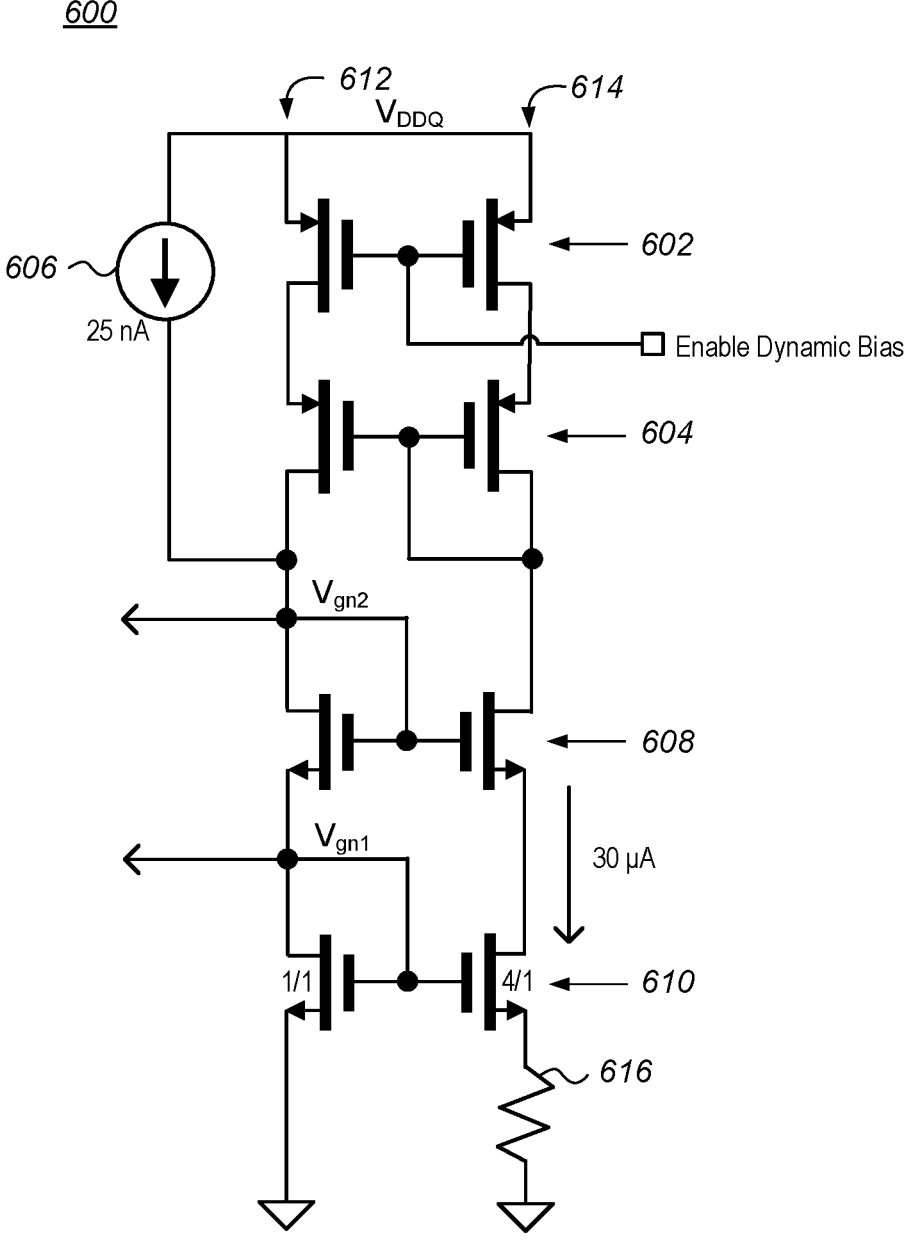
FIG. 6 is a schematic diagram of an embodiment of a dynamic biasing circuit for use in the current-sink of FIG. 4.

FIG. 6 is a schematic diagram of an embodiment of a dynamic biasing circuit for use in the current-sink of FIG. 4. Briefly, the dynamic biasing circuit 600 is or functions as a Vgs/R current reference that is enabled only when Enable Dynamic Bias signal is set to logic '0' during the current sinking phase. When enabled the circuit produces a bias current of approximately 30 μA, otherwise it is approximately 25 nA. Referring to FIG. 6, dynamic biasing circuit 600 includes two pairs of PMOS transistors 602, 604, coupled in parallel with a current source 606 between a voltage supply ($V_{DDQ}$) and through two pairs of NMOS transistors 608, 610, to ground. The first pair of PMOS transistors 602 operate as a switch to turn on the dynamic biasing circuit 600 when the enable dynamic bias signal is received. In operation, when the enable dynamic bias signal is not present the current source 606 raises gate voltages of the two pairs of NMOS transistors 608, 610, at nodes $V_{gn1}$ and $V_{gn2}$ above ground, pre-biasing the NMOS transistors, and thereby enabling a very fast turn-on time for the dynamic biasing circuit 600. When the enable dynamic bias signal is received the first pair of PMOS transistors 602 are turned-on causing a current flow through first and second legs 612, 614, of the dynamic biasing circuit 600 and turning on the second pair of PMOS transistors 604, which function as a current mirror to ensure equal current flow the PMOS transistors in both the first and second legs 612, 614. The increased current quickly turns-on the two pairs of NMOS transistors 608, 610, which then operate as a Cascode current mirror passing a 30 μA current through a large resistor 616 in the second leg 614 of the dynamic biasing circuit 600, and generating voltages on nodes $V_{gn1}$ and $V_{gn2}$ to dynamically bias the comparator 416 from barely on to a high-precision mode. By high-precision it is meant that the comparator 416 is operable to detect differences between $V_{SSHV}$ REF and $V_{SSHV}$ of about 1 mV, or less with 1 ns propagation delay. Referring again to FIG. 6, applying Kirchhoff's Voltage Law (KVL) a $V_{GS}$ of the left transistor (1/1) of the second pair of NMOS transistors 610, equals a $V_{GS}$ of the right transistor (4/1) plus the voltage across resistor 616. Larger device ratio of the right transistor (4/1) indicates a smaller $V_{GS}$, than the $V_{GS}$ of the left transistor (1/1) for the same drain currents.

Figure 7:
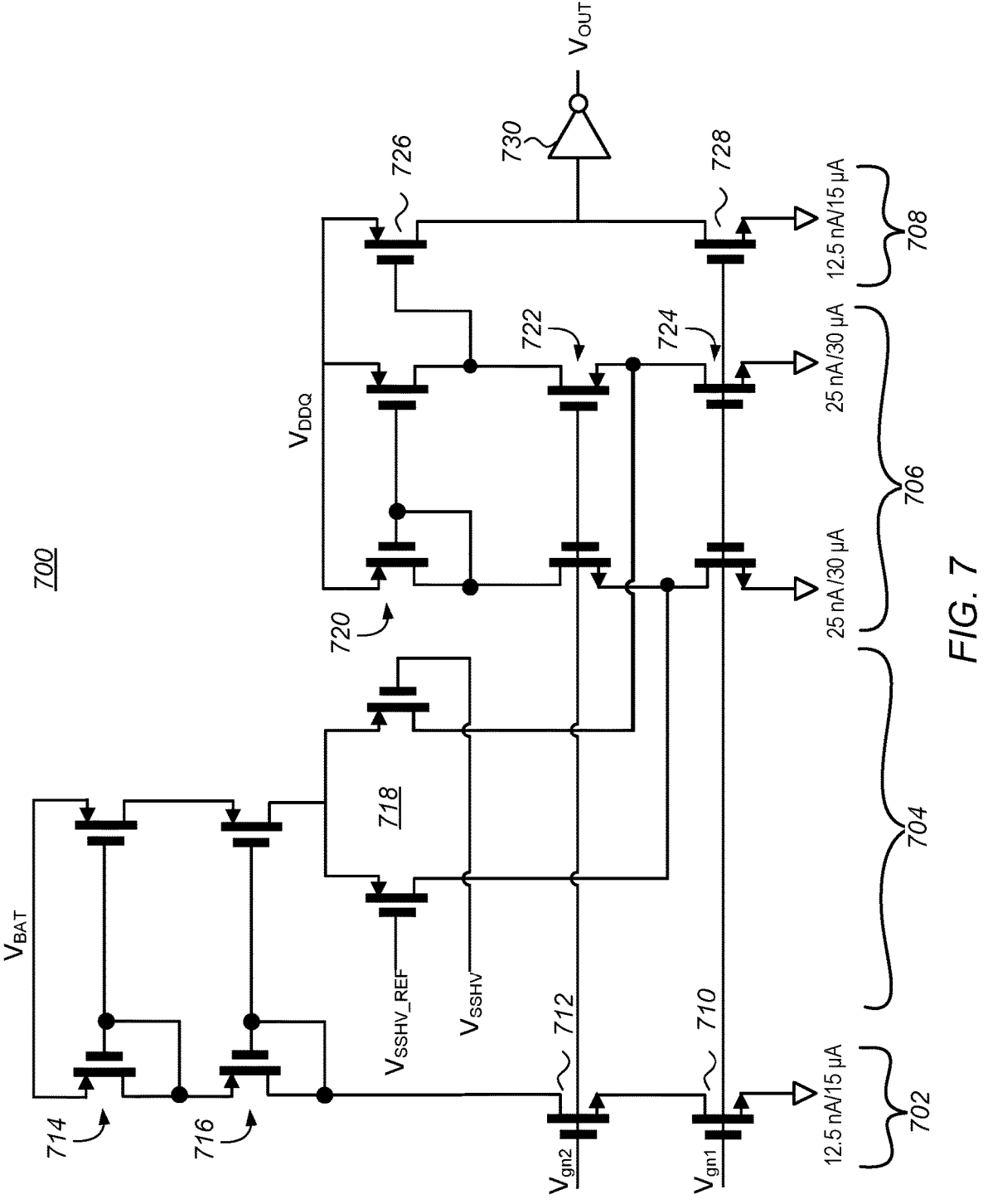
FIG. 7 is a schematic diagram of an embodiment of a comparator for use in the current-sink of FIG. 4.

FIG. 7 is a schematic diagram of an embodiment of a comparator for use in the current-sink of FIG. 4. Referring to FIG. 7, the comparator 700 has a folded-Cascode topology including a biasing stage 702, an input stage 704, a Cascode stage 706, and an output buffer 708. NMOS transistors 710 and 712, receive the voltages $V_{gn1}$ and $V_{gn2}$ from the dynamic biasing circuit 600, and through first and second current mirrors 714, 716 when dynamic biasing is enabled increase a voltage applied to a PMOS amplifier 718 in the input stage 704, thereby increasing gain of the PMOS amplifier and improving sensitivity and accuracy of the comparator 700.

The Cascode stage 706 generally includes a PMOS current mirror 720 coupled to a voltage supply ($V_{DDQ}$), and first and second pairs of NMOS transistors 722, 724, coupled between the PMOS current mirror and ground and configured to amplify an output from the input stage 704. The output buffer 708 includes series connected PMOS and NMOS transistors 726, 728, and an inverter 730. The PMOS transistor 726 has a source coupled to $V_{DDQ}$, a drain coupled ground through the NMOS transistor 728, and a gate coupled to receive an output from the Cascode stage 706. The NMOS transistor 728 has a drain coupled to $V_{DDQ}$, through the PMOS transistor 726, a source coupled ground and a gate coupled to receive the voltage $V_{gn1}$. Like the biasing stage 702 and the input stage 704, the biasing current of the Cascode stage 706 and output buffer 708 is also increased when the dynamic biasing is enabled, and thus the propagation delay of the comparator 700 is reduced accordingly to ensure precise timing to turn off current sinking switch 402 at the end of current sinking phase. In particular, it is noted that as shown in FIG. 7, the biasing current of all stages 702, 704, and 706 and the output buffer 708 is increased when the dynamic biasing is enabled from a quiescent current of about 12.5 nA to about 30 μA.

Figure 8:
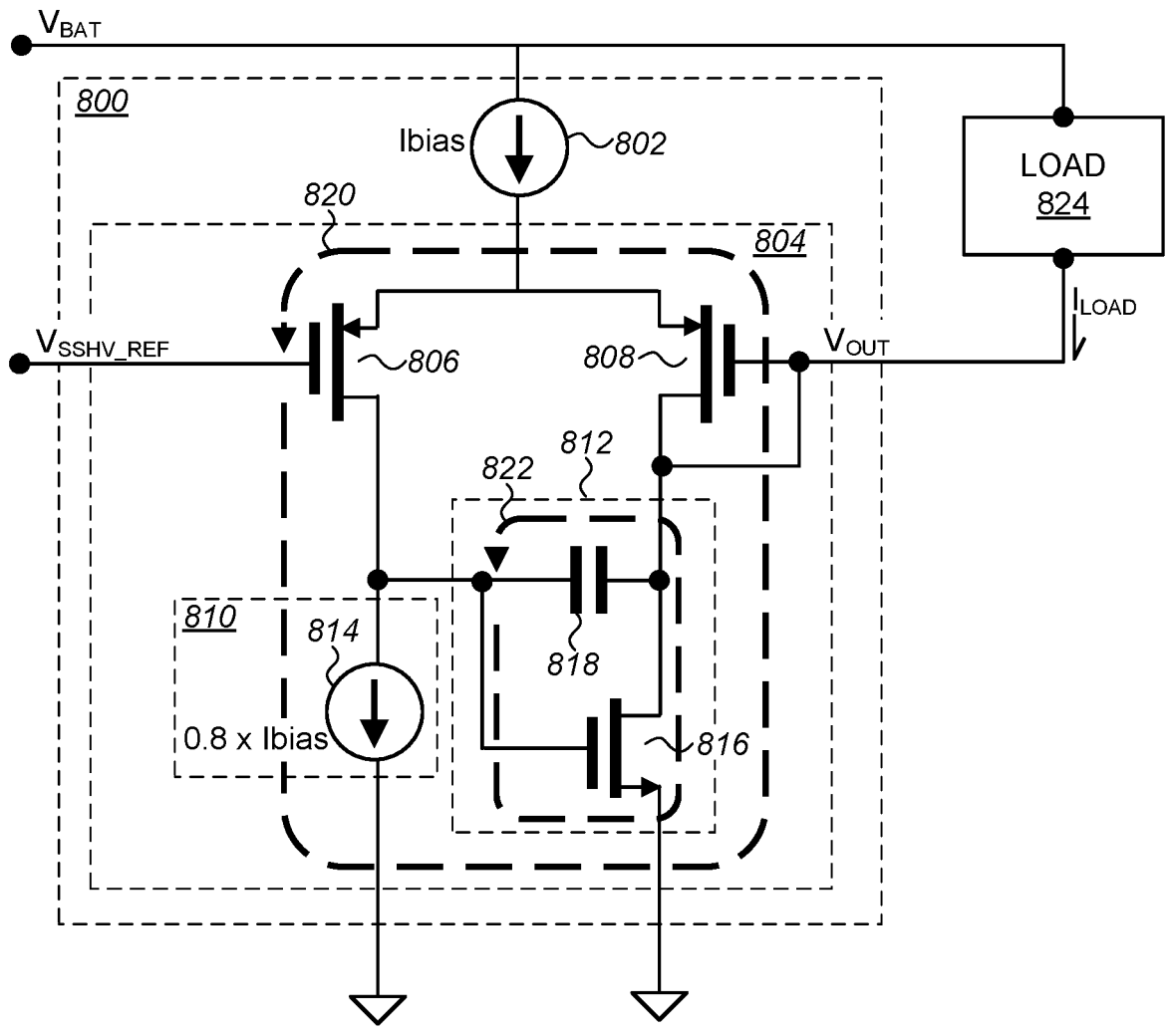
FIG. 8 is a schematic diagram of a low-power, fast-transient current-sink (I-sink) buffer.

An embodiment of a current-sink (I-sink) buffer 800 will now be described with reference to FIG. 8. FIG. 8 is a schematic block diagram of an embodiment of a current-sink (I-sink) buffer 800. Referring to FIG. 8, the I-sink buffer 800 generally includes a first current source 802 coupled to a DC input voltage ($V_{BAT}$) and operable to generate a biasing current ($I_{bias}$), and a one-stage, differential amplifier 804 coupled between the first current source and ground. The differential amplifier 804 includes a first transistor 806 having a gate coupled to a buffer input to receive floating-rail reference voltage ($V_{SSHV\_REF}$), and a source coupled to the first current source 802, and a second transistor 808 matched to the first transistor, having a source coupled to the first current source and to the source of the first transistor. The second transistor 808 is diode connected with a gate coupled to a drain and to a buffer output to output a buffered output voltage ($V_{OUT}$). As shown, the first and second transistor 806, 808, include p-type or p-channel MOS (PMOS) transistors.

The differential amplifier 804 further includes a first current sink 810 through which a drain of the first transistor 806 is coupled to ground, and a second current sink 812 through which the drain of the second transistor 808 is coupled to ground. The first current sink includes a second current source 814 through which a drain of the first transistor 806 is coupled to ground. The second current sink 812 includes a third transistor 816 having a source coupled to ground, a drain coupled to the drain of the second transistor 808, and a gate coupled to the drain of the first transistor 806, and through a capacitor coupled between the gate and drain of the third transistor to the drains of both the second and third transistors 808, 816. The third transistor 816 has a channel-type different from the first and second transistors 806, 808, and in the embodiment shown is a NMOS transistor.

The first and second transistors 806, 808, and first and second current sinks 810, 812, of the 804 form a first KVL loop or first closed-loop 820. The first closed-loop 820 is operable to provide to a $V_{OUT}$ that tracks the $V_{SSHV\_REF}$ received on the input. The use of a second current source 814 generating a current half that of the first current source 802 or 0.5·Ibias, instead of a diode-connected transistor 108 as shown in FIG. 1, enables the third transistor 816 in the first closed-loop 820 to provide a $V_{OUT}$ equal to $V_{SSHV\_REF}$, for $V_{SSHV\_REF}$ from 0 V to $V_{BAT}$–$V_{GS}$, where $V_{GS}$ is a gate-source voltage of the first transistor 806.

The I-sink buffer 800 further includes a smaller, second closed-loop 822 also formed in the differential amplifier 804 by the third transistor 816 and capacitor 818 or the second current sink 812, which is operable to sink at least a portion of a load current ($I_{LOAD}$) of a load 824 coupled between the output and $V_{BAT}$ to ground during spikes or transients in $I_{LOAD}$. During transients in the load current, the capacitor transforms the third transistor 816 into diode connected transistor, sinking the transient in $I_{LOAD}$ to ground. It is further noted that a bandwidth of the second closed-loop 822 is independent of the current ($I_{bias}$) of the first current source 802, enabling $I_{bias}$ to be maintained at a predetermined minimum current less than or equal to 28 nano-amperes (nA), independent of $V_{BAT}$ and $I_{LOAD}$. The load 824 charges the capacitor 818, which subsequently pulls up the gate of transistor 816 to immediately sink the load to ground. Thus, the I-sink buffer 800 harvests the current from the load 824 itself to perform the sinking instead of relying on $I_{bias}$ alone as in the conventional buffer circuits, and $I_{bias}$ is constant during both quiescent operation and load sinking.

Figure 9:
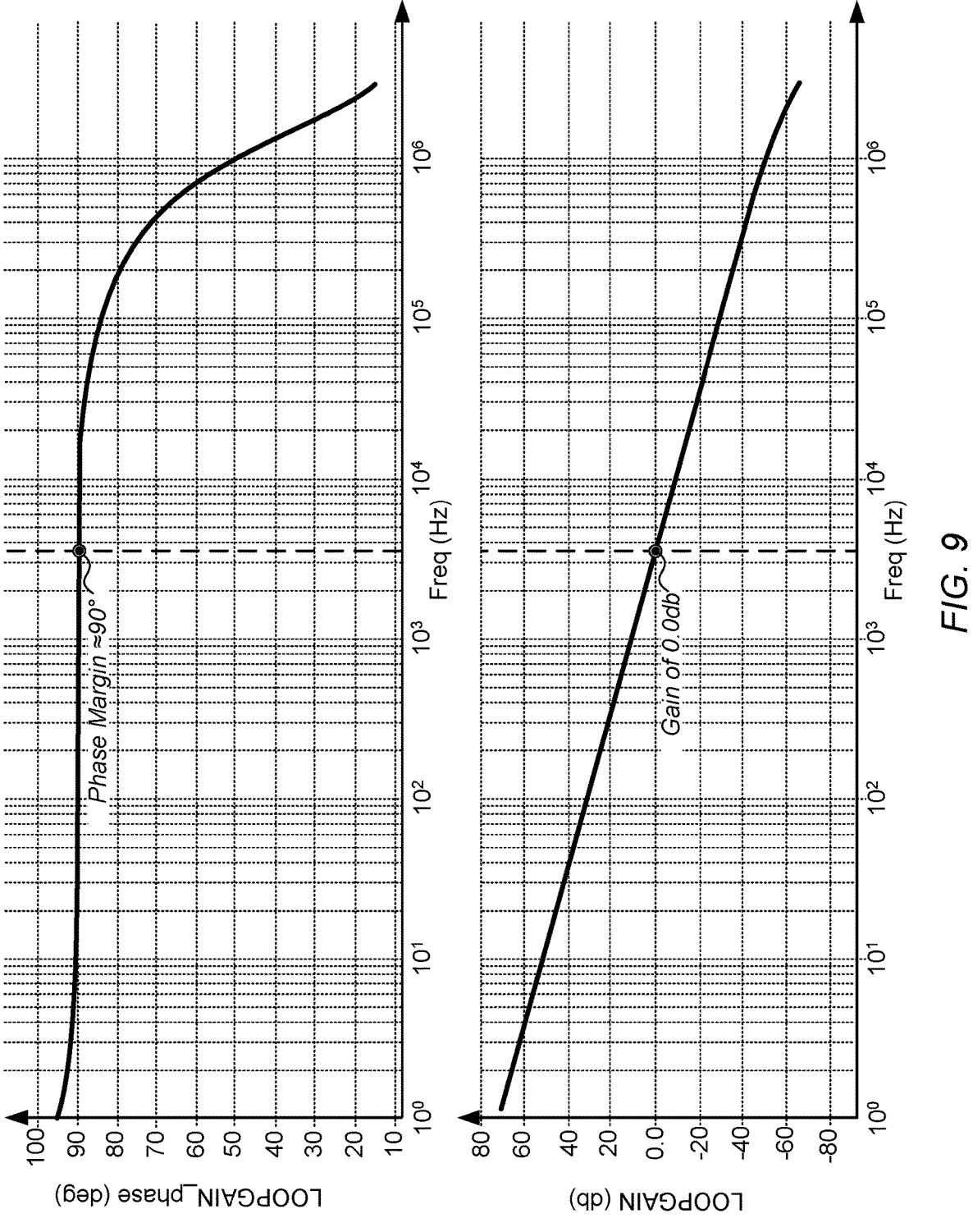
FIG. 9 includes graphs showing gain (LOOPGAIN) and phase margin (LOOPGAIN_phase) versus frequency (Freq.) for the I-sink buffer of FIG. 8, and illustrating the stability and bandwidth of the circuit.

FIG. 9 includes graphs showing gain (LOOPGAIN) and phase margin (LOOPGAIN_phase) versus frequency (Freq.) for the I-sink buffer of FIG. 8 illustrating the stability and bandwidth of the circuit. Referring to the lower graph of FIG. 9 it is seen that the I-sink Buffer 800 has a unity gain of 0.0 db at a frequency of about 3.6 kHz. Referring to the upper graph 9 it is seen that at the same frequency the I-sink Buffer 800 has a phase margin of about 90°.

Figure 10:
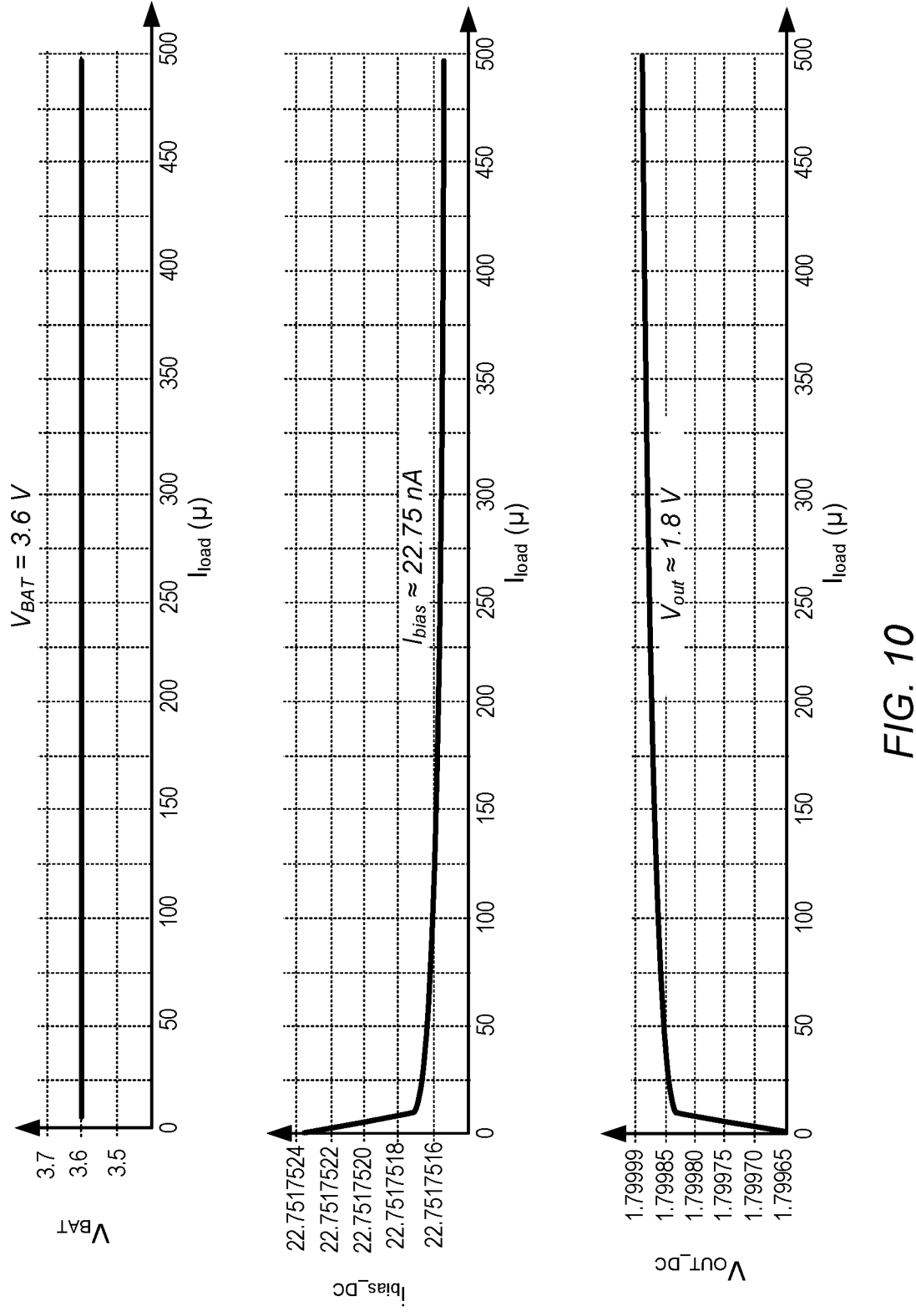
FIG. 10 includes graphs of $V_{BAT}$, bias current ($I_{bias\_DC}$) and output voltage ($V_{OUT\_DC}$) versus load current ($I_{load}$) for the I-sink buffer of FIG. 8 with a battery voltage of 3.6 V.

FIG. 10 includes graphs of bias current and output voltage versus load current for the I-sink buffer of FIG. 8 illustrating the ability of the circuit to provide a well-regulated output voltage with a consistently low bias current and of the circuit with a battery voltage of 3.6 V. Referring to FIG. 10, it is seen that for a $V_{BAT}$=3.6 V (top graph), the bias current ($I_{bias\_DC}$) remains consistently low at a current of about 22.75 nA (middle graph), with a well-regulated output voltage ($V_{OUT\_DC}$) of about 1.8 V as the load current ($I_{load}$), shown on the horizontal axis, increases from 0 to 500 microamperes (μA).

Figure 11:
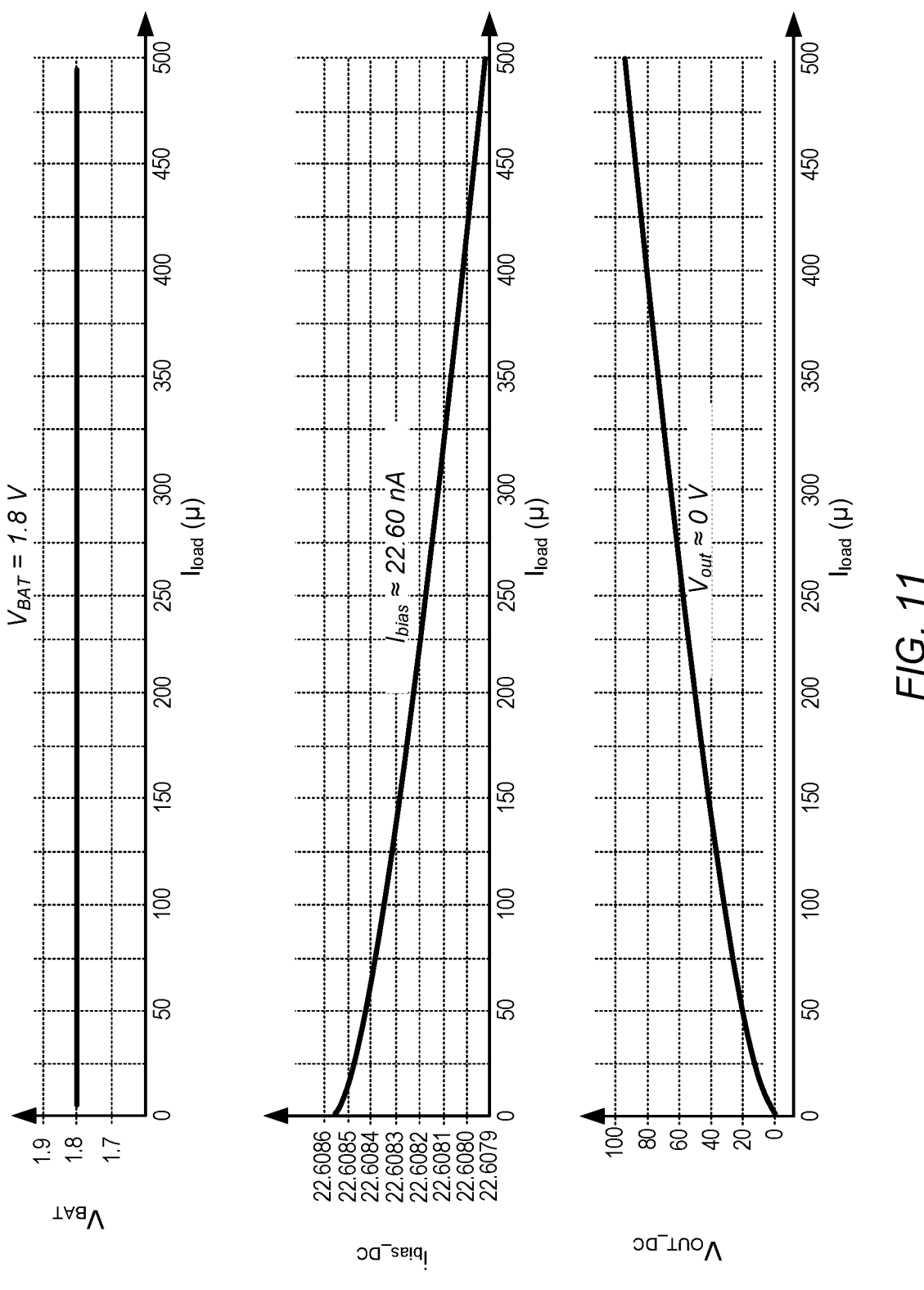
FIG. 11 includes graphs of a battery voltage ($V_{BAT}$), bias current ($I_{bias\_DC}$) and output voltage ($V_{OUT\_DC}$) versus load current ($I_{load}$) for the I-sink buffer of FIG. 8 with a battery voltage of 1.8 V.

FIG. 11 includes similar graphs of bias current ($I_{bias\_DC}$) and output voltage ($V_{OUT\_DC}$) versus load current ($I_{load}$) illustrating the ability of the I-sink buffer of FIG. 8 to provide a well-regulated output voltage with a consistently low bias current and of the circuit with a battery voltage of 1.8 V. Referring to FIG. 11, it is seen that for a $V_{BAT}$=1.8 V (top graph), the bias current ($I_{bias\_DC}$) remains consistently low at a current of about 22.66 nA (middle graph), with a well-regulated output voltage ($V_{OUT\_DC}$) of about 0 V as the load current ($I_{load}$), shown on the horizontal axis, increases from 0 to 500 microamperes (μA).

Figure 12:
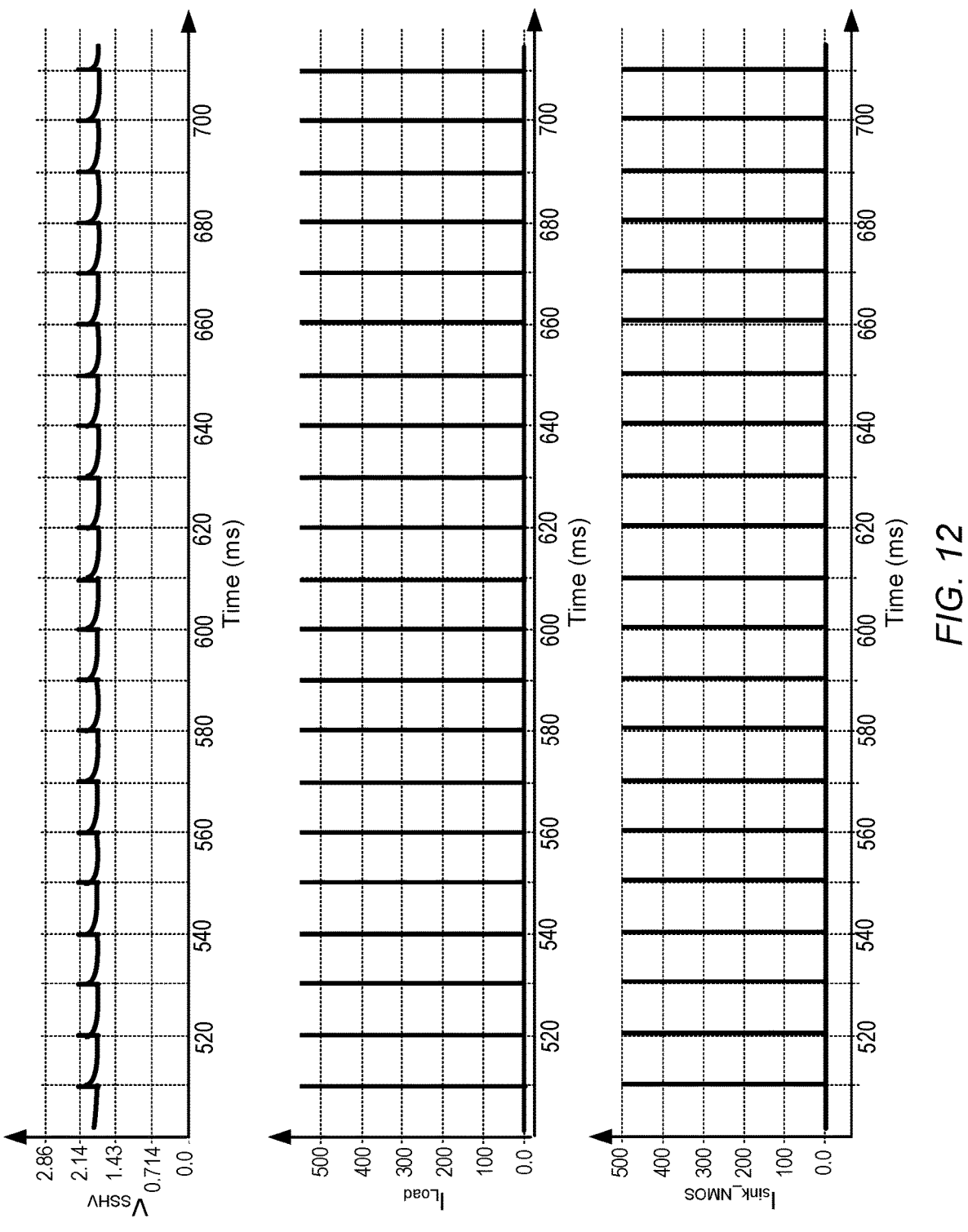
FIG. 12 includes graphs shows a floating-rail voltage ($V_{SSHV}$) output from the I-sink buffer of FIG. 8 and a sinking current ($I_{sink\_NMOS}$) versus time in response to a number of fast-transients or spikes in load current ($I_{load}$) and illustrating the ability of the circuit to sink transient currents in $I_{load}$.

FIG. 12 includes graphs shows a floating-rail voltage ($V_{SSHV}$) output from the I-sink buffer of FIG. 8 and a sinking current ($I_{sink\_NMOS}$) versus time in response to a number of fast-transient spikes or pulses in load current ($I_{load}$) and illustrating the ability of the circuit to sink transient currents in $I_{load}$. In particular, the middle graph shows the pulses in load, the lower graph shows the corresponding spikes or pulses in sinking current ($I_{sink\_NMOS}$), and the top graph illustrates the resultant low, brief increase in floating-rail voltage ($V_{SSHV}$), less than about 0.2 V.

Figures 13A, 13B:
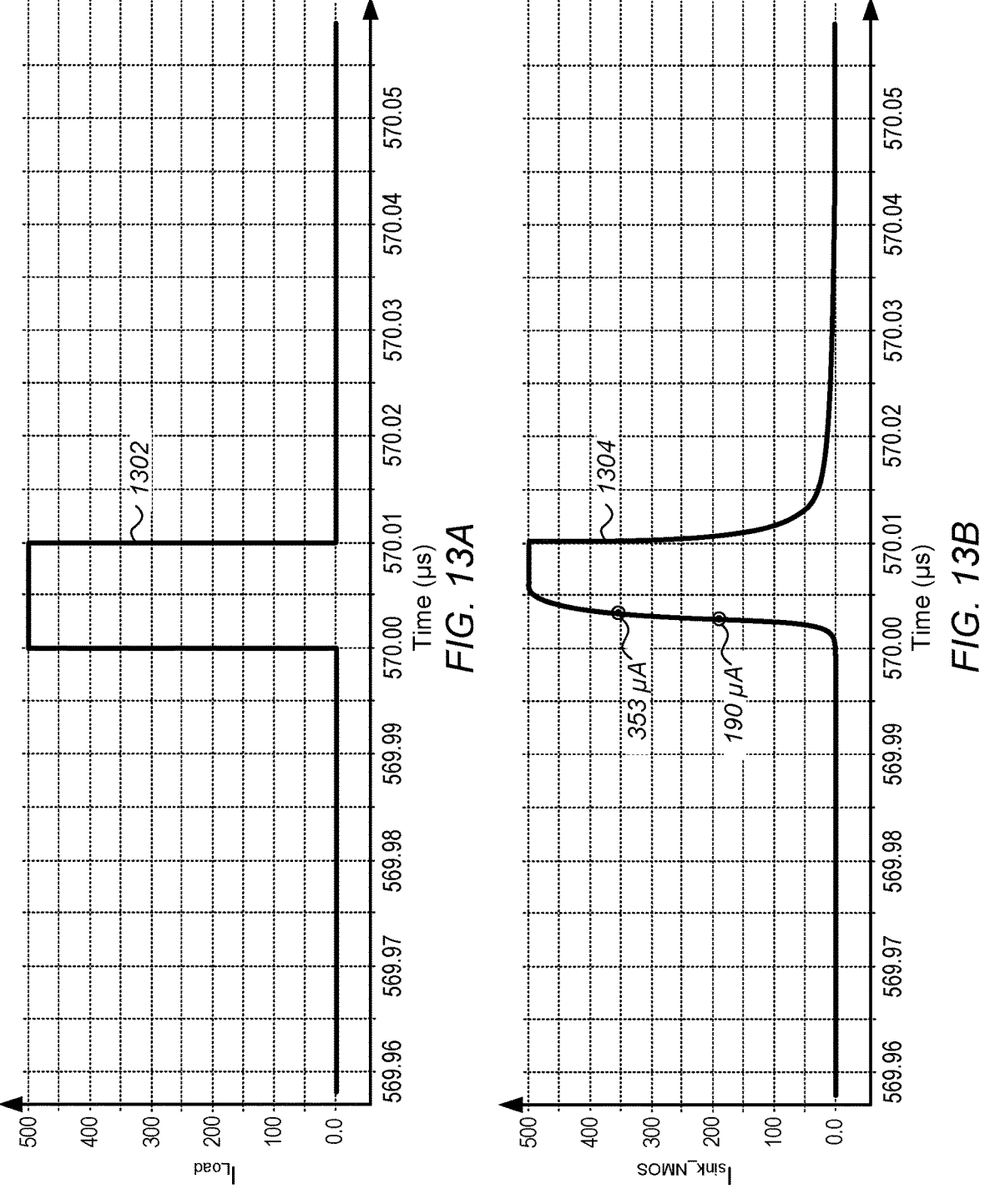
FIGS. 13A and 13B are graphs illustrating, respectively, a single spike in load current ($I_{load}$) and the resultant sinking current ($I_{sink\_NMOS}$) from the graphs of FIG. 12.

FIGS. 13A and 13B are graphs illustrating, respectively, a single pulse in load current ($I_{load}$) and the resultant sinking current ($I_{sink\_NMOS}$) from the graphs of FIG. 12 in greater detail. Referring to FIG. 13A it is seen the pulse in load current ($I_{load}$ 1302) begins at 570 microseconds (μs), has a duration of about a 10 nanosecond (ns) and a rise in load current ($I_{load}$) from 0 to 500 μA with rise and file times of less than about 1 picosecond (ps), or about 500 amperes per microsecond (A/μs). Referring to FIG. 13B it is seen the pulse the corresponding pulse or increase in sinking current ($I_{sink\_NMOS}$ 1304) begins shortly after the pulse in load current ($I_{load}$ 1302) and has a sinking current of about 190 μA after about time 570.0025 μs, and a sinking current 353 μA about time 570.0035 μs, for a rise time of about 10 ps, or about 274 amperes per microsecond (A/μs). The sinking current settles at a steady current substantially equal to the pulse in load current ($I_{load}$ 1302) of about 500 μA after which it begins to quickly fall back to a sinking current of about 0.0 μA beginning at time 570.01 μs.

Figure 14:
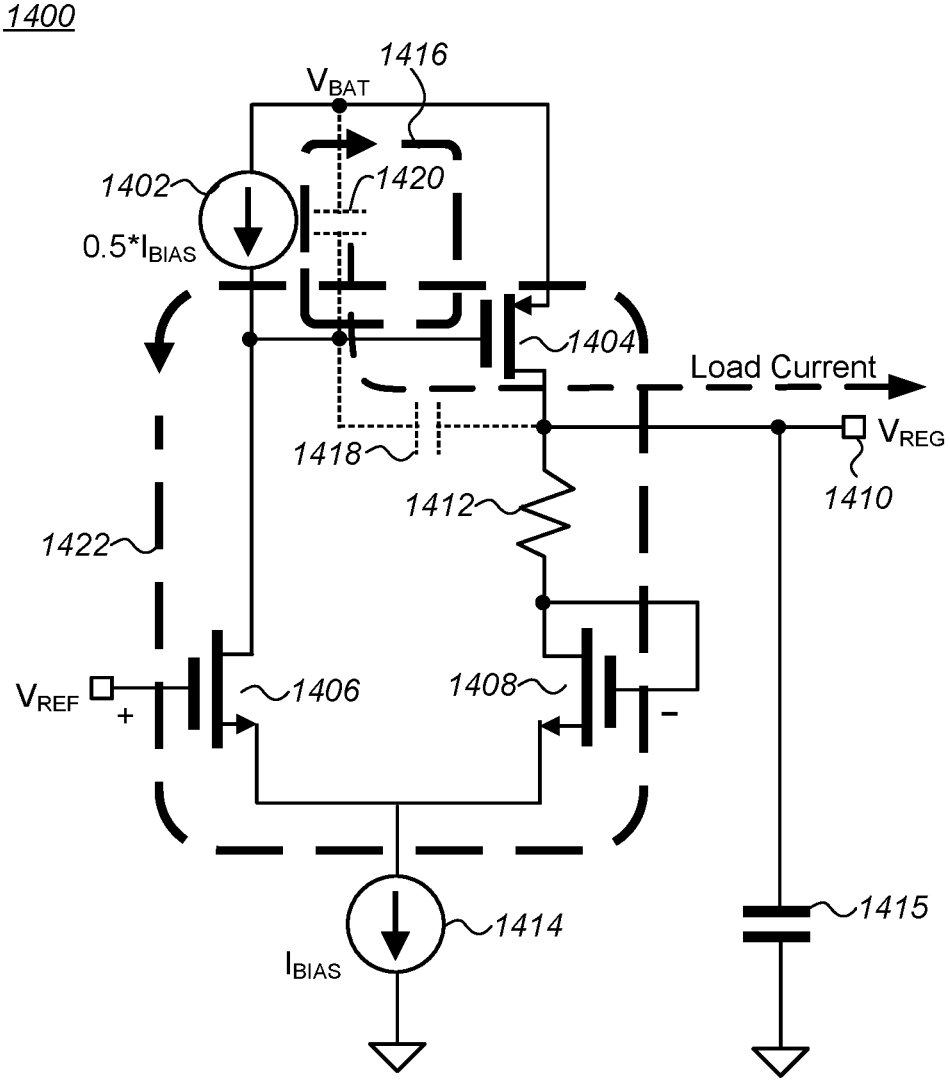
FIG. 14 is a schematic diagram of a low-power, low drop out (LDO) regulator with direct feed-forward operable to provide a regulated voltage ($V_{REG}$) for battery voltages from 1.8 V.

FIG. 14 is a schematic diagram of a low-power, low drop out (LDO) regulator 1400 operable to provide a regulated voltage ($V_{REG}$) for battery voltages from 1.8 V to 3.6 V. Briefly, the LDO regulator 1400 includes low-power one-stage differential amplifier including a first current source 1402 with a current of 0.5*$I_{BIAS}$ and a PMOS transistor 1404, and to an NMOS differential pair formed by a first NMOS transistor 1406 and a second NMOS transistor 1408.

The PMOS transistor 1404 includes a source coupled to $V_{BAT}$, a drain coupled to an output node 1410 of the LDO regulator 1400 and through a resistor 1412 to a drain of the second NMOS transistor 1408, and a gate coupled to an output of a first current source 1402 and to a drain of the first NMOS transistor 1406. The PMOS transistor 1404 is operable as an amplifier "mirroring" a load coupled to the output node 1410 of the LDO regulator 1400.

The first NMOS transistor 1406 includes a gate operable as a positive (+) input of the differential pair and coupled to receive a reference voltage, either $V_{DD\_REF}$ from the constant-rail reference generator 204 or bandgap reference generator 116, and a source coupled to ground through a second current source 1414. The second NMOS transistor 1406 is diode connected with a gate coupled to a drain and operable as a negative (−) input of the differential pair and also coupled through the resistor 1412 to the output node, and a source coupled to ground through the second current source 1414.

The LDO regulator 1400 further includes a capacitor 1415 coupled between the output node 1410 and ground to stabilize the regulated voltage (V) output from the LDO regulator.

A direct feed-forward (DFF) loop 1416 formed by PMOS transistor 1404 and a parasitic gate-to-drain capacitance ($C_{GD}$ 1418) allows a load current to charge a parasitic gate-to-source capacitance ($C_{GS}$ 1420) of the PMOS transistor during fast load transients. The unity gain bandwidth of the amplifier formed by PMOS transistor 1404 operating with the DFF loop 1416 (DFF$_{UGBW}$) can be approximated by equation 3 below:

$$DFF_{UGBW} = \frac{gm_{PMOS\ transistor}}{2\pi(C_{GS} + C_{GD})} \qquad (3)$$

where DFF$_{UGBW}$ is the unity gain, $gm_{PMOS\ transistor}$ is the transconductance of the PMOS transistor 1404, $C_{GS}$ is the parasitic gate-to-source capacitance of the PMOS transistor, and $C_{GD}$ is the parasitic gate-to-drain capacitance of the PMOS transistor.

An indirect regulation feedback (IRF) loop 1422 formed by the NMOS differential pair, resistor 1412 and PMOS transistor 1404 provide DC voltage regulation of the output voltage (V$_{REG}$) under non-transient load conditions. Note, that the IRF loop 1422 is indirect since the IRF loop does not connect the output node and the negative (−) input of the differential pair. The IRF loop 1422 forces the diode voltage of the second NMOS transistor 1408 to be at V$_{REF}$ and bias current from the first current source 1402 (0.5*I$_{BIAS}$) to flow through resistor 1412. V$_{REG}$ can derived from equation 4 below:

$$V_{REG} = V_{BG}\left(1 + \frac{R}{2R_{BG}}\right) \qquad (4)$$

where V$_{BG}$ reference voltage (either from a bandgap generator or V$_{DD\_REF}$), R is a resistance of resistor 1412, and R$_{BG}$ is a resistance of the reference voltage generator.

Figure 15:
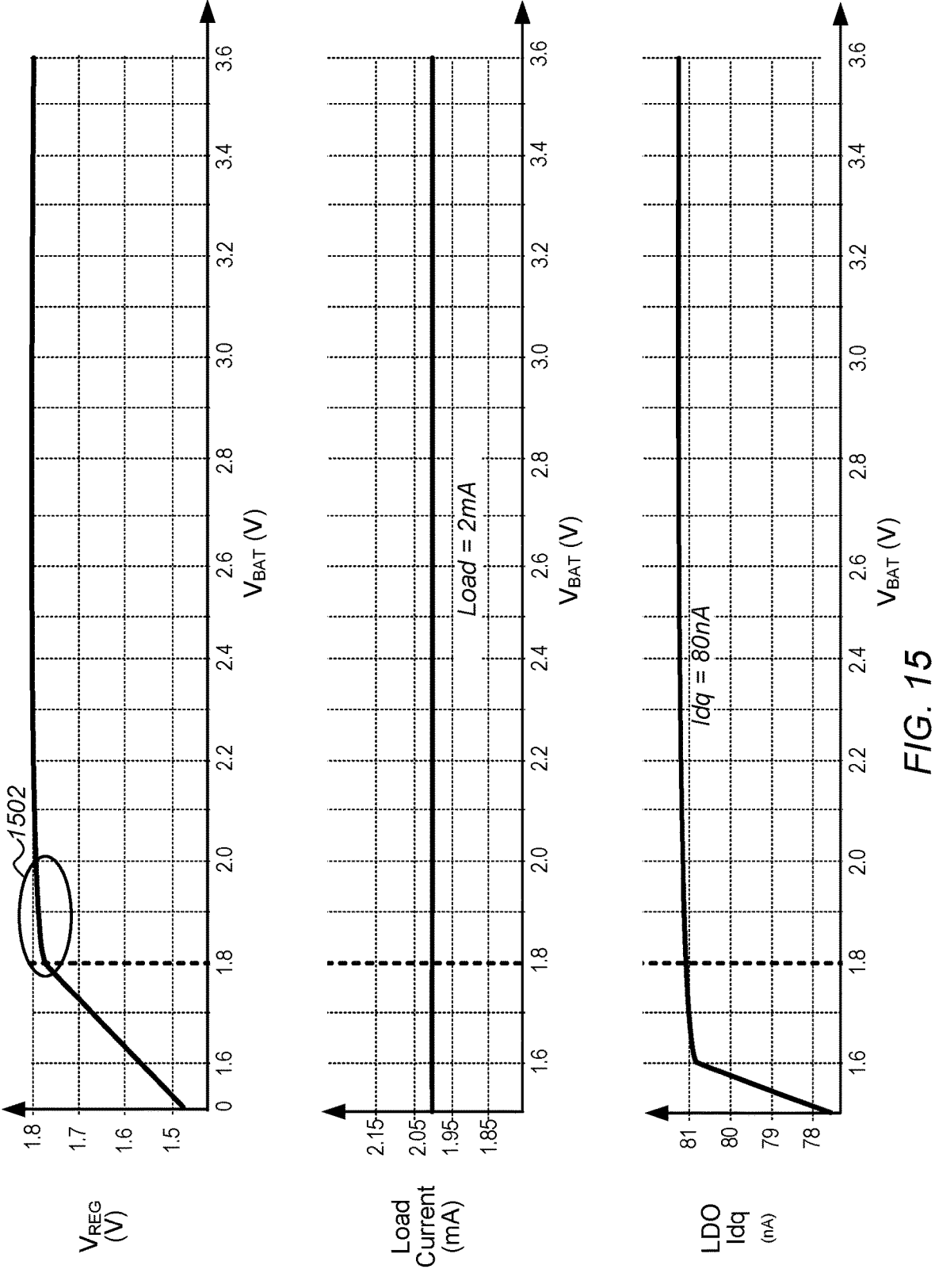
FIG. 15 are graphs illustrating, respectively, $V_{REG}$, $I_{load}$ and a quiescent drain current (Idq) versus battery voltage for the LDO regulator of FIG. 14.

FIG. 15 are graphs illustrating, respectively, a regulated output voltage (V$_{REG}$), load current (I$_{load}$) and a quiescent current (Idq) of the LDO regulator of FIG. 14 for battery voltages between 1.5 V and 1.8 V. Referring to the top graph of FIG. 15, it is seen that the LDO regulator has a drop-out voltage of 1.8 V, and is operable to generate a regulated output voltage (V$_{REG}$) of about 1.8 V for battery voltages (V$_{BAT}$) between 1.8 V and 3.6 V, with an under voltage (shown in ellipse 1502) of less than about 25 mV from 1.8 V and 1.9 V. As shown in the middle graph, the LDO regulator is capable of supplying a stable load current (I$_{load}$) of 2 mA over the same range of battery voltages. Referring to lower graph of FIG. 15, because the direct feed forward (DFF) of the LDO regulator is "on-demand" (only during transient) and it uses the load current, the quiescent current (Idq) remains consistently low at a current of about 80 nA.

Figure 16:
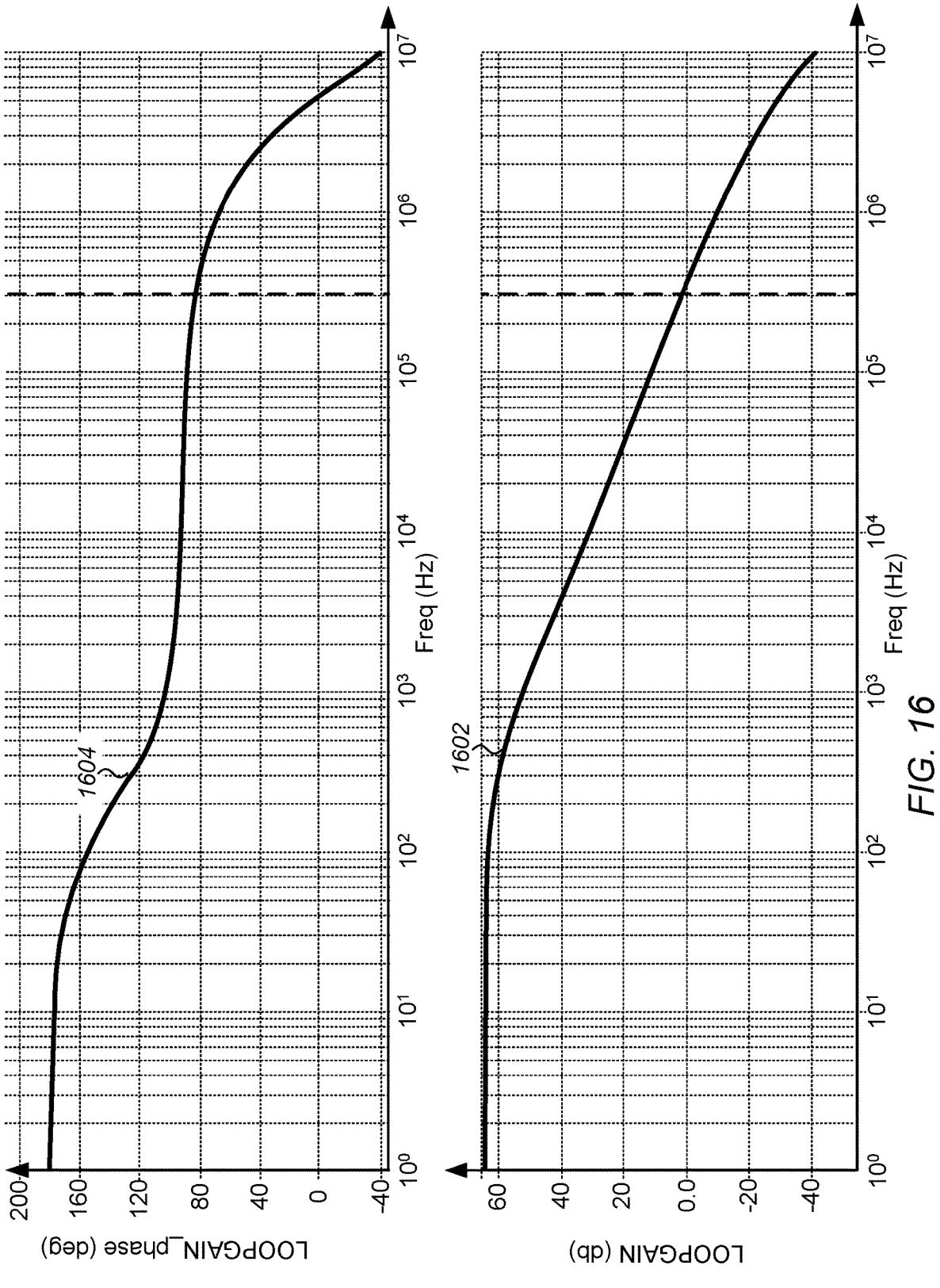
FIG. 16 are graphs of LOOPGAIN and LOOPGAIN_phase versus frequency for the LDO regulator of FIG. 14 at a load current ($I_{load}$) of 1 microamperes (μA)

FIGS. 16-19 include graphs showing LOOPGAIN and LOOPGAIN_phase versus frequency for the LDO regulator of FIG. 14 at load currents (I$_{load}$) from 1 microamperes (μA) to 100 mA illustrating the stability and bandwidth of the LDO regulator. Referring to FIG. 16 it is seen that the LDO regulator has a LOOPGAIN 1602 of unity of 0.0 db and a LOOPGAIN_phase 1604 phase margin greater than 80° at a frequency of about 318 kHz, with an Idq of about 80 nA, at a V$_{BAT}$ of 3.6 V, and supplying a load current (I$_{load}$) of 1 μA to no capacitance load.

Figure 17:
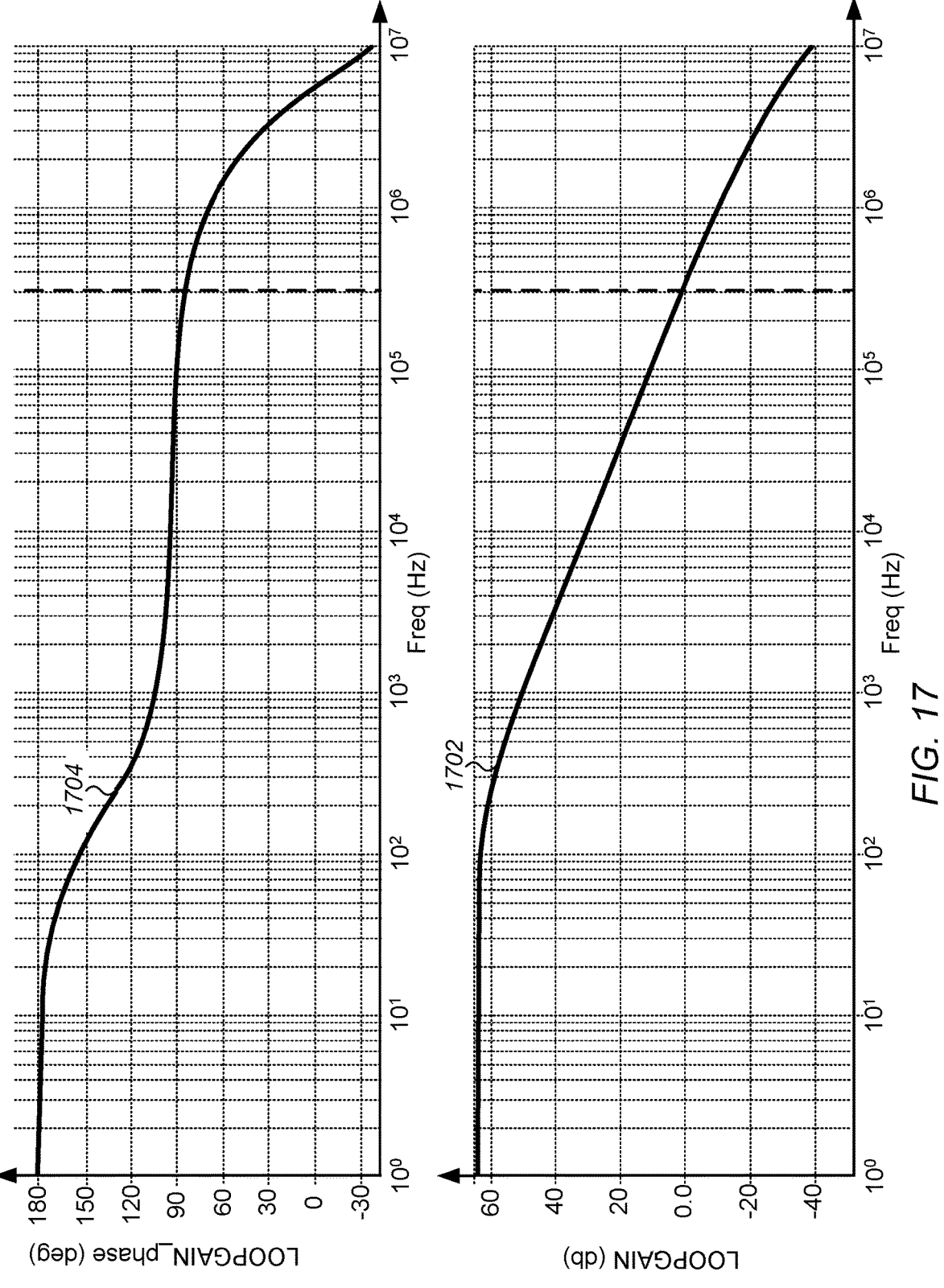
FIG. 17 are graphs of LOOPGAIN and LOOPGAIN_phase versus frequency for the LDO regulator of FIG. 14 at an $I_{load}$ of 1 milliamperes (mA)

Referring to FIG. 17 it is seen that the LDO regulator has a LOOPGAIN 1702 of unity of 0.0 db and a LOOPGAIN_phase 1704 phase margin greater than 80° at a frequency of about 331 kHz, with an Idq of about 80 nA, at a V$_{BAT}$ of 3.6 V, and supplying an I$_{load}$ of 1 mA to no capacitance load.

Figure 18:
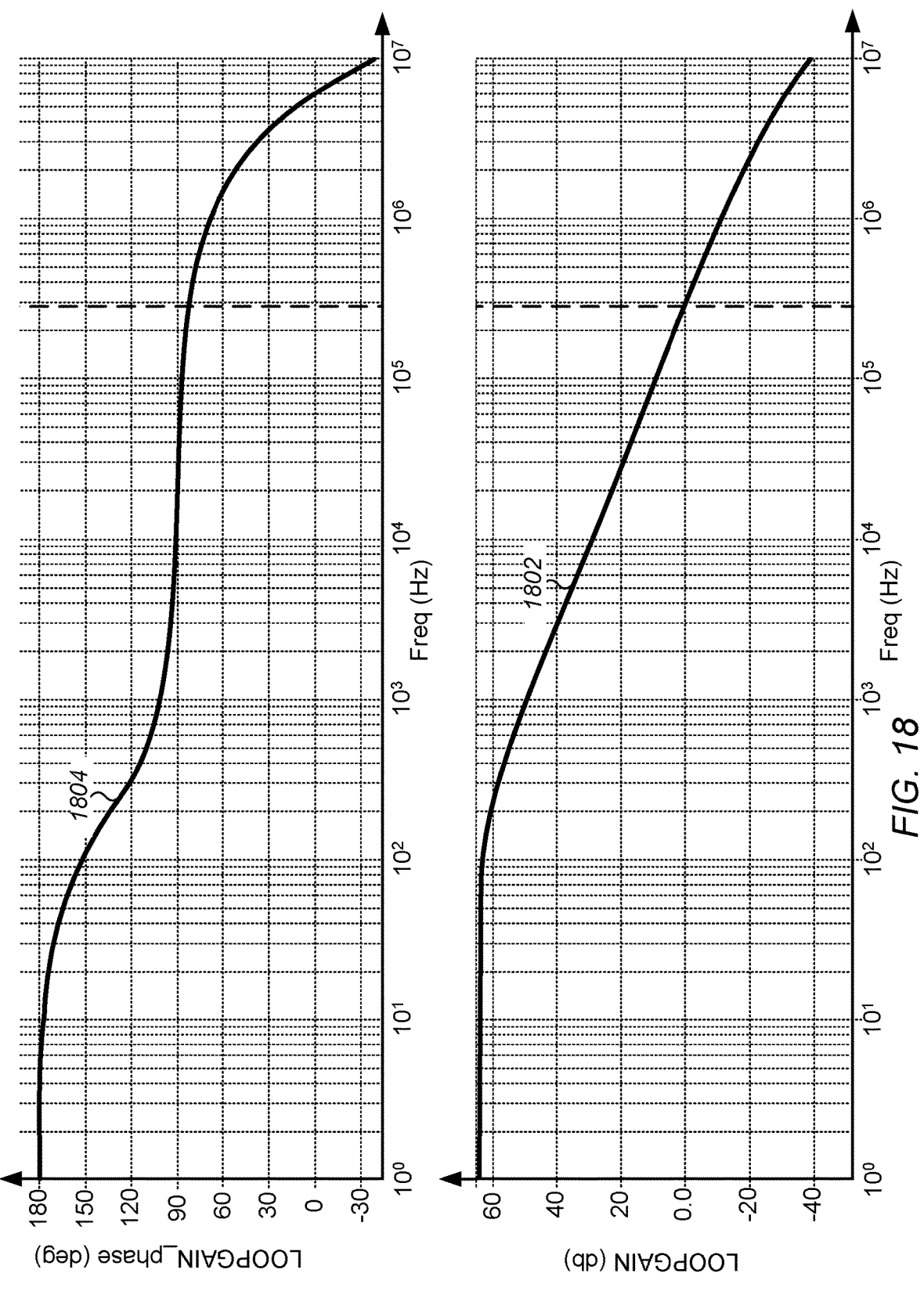
FIG. 18 are graphs of LOOPGAIN and LOOPGAIN_phase versus frequency for the LDO regulator of FIG. 14 at an $I_{load}$ of 10 mA.

Referring to FIG. 18 it is seen that the LDO regulator has a LOOPGAIN 1802 of unity of 0.0 db and a LOOPGAIN_phase 1804 phase margin greater than 80° at a frequency of about 289 kHz, with an Idq of about 80 nA, at a V$_{BAT}$ of 3.6 V, and supplying an I$_{load}$ of 10 mA to no capacitance load.

Figure 19:
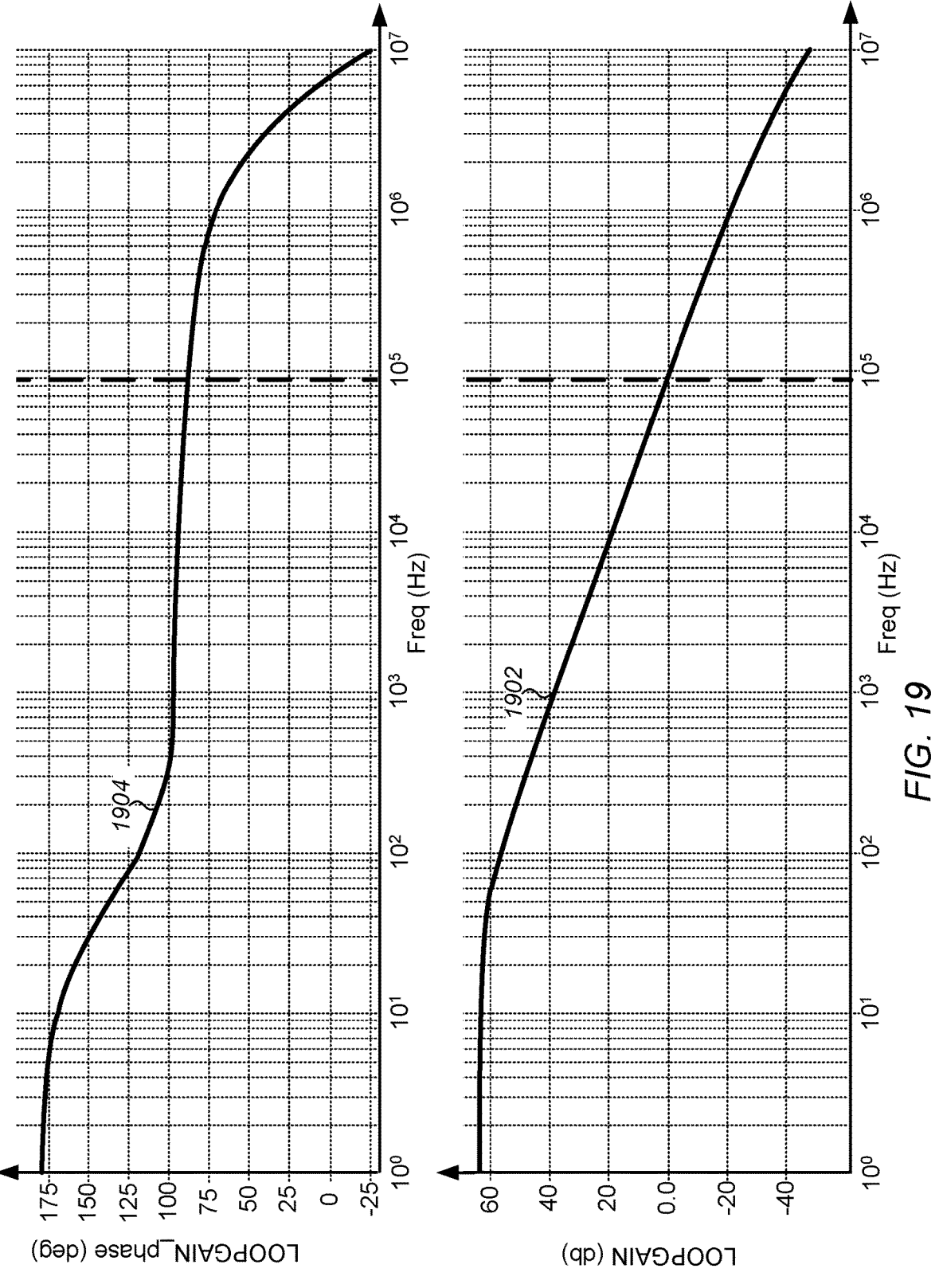
FIG. 19 are graphs of LOOPGAIN and LOOPGAIN_phase versus frequency for the LDO regulator of FIG. 14 at an $I_{load}$ of 100 mA.

Referring to FIG. 19 it is seen that the LDO regulator has a LOOPGAIN 1902 of unity of 0.0 db and a LOOPGAIN_phase 1904 phase margin greater than 80° at a frequency of about 87 kHz, with an Idq of about 80 nA, at a V$_{BAT}$ of 3.6 V, and supplying an I$_{load}$ of 100 mA to no capacitance load.

Figure 20:
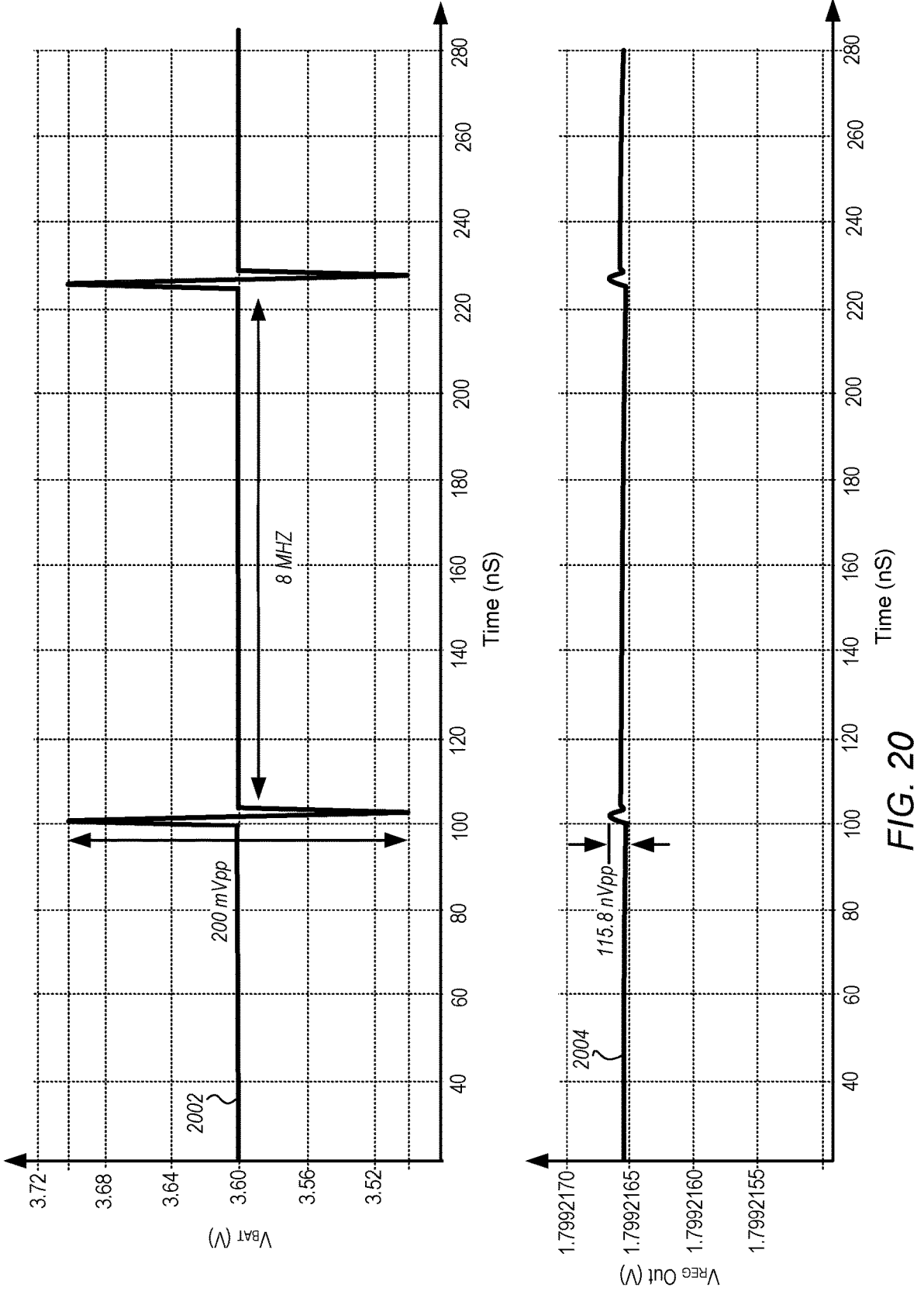
FIG. 20 are graphs of transients in power ($V_{BAT}$) supplied to the LDO regulator and the resulting voltage out ($V_{REG}$) during a time encompassing the transients illustrating a power supply rejection ratio (PSRR) for the LDO regulator of FIG. 14.

FIG. 20 are graphs of transients in power (V$_{BAT}$) supplied to the LDO regulator and the resulting voltage out (V$_{REG}$) during a time encompassing the transients illustrating a power supply rejection ratio (PSRR) for the LDO regulator of FIG. 14. Referring to FIG. 20 the top graph illustrates a V$_{BAT}$ 2002 3.6 V with 200 millivolt peak-to-peak (mVpp) transients recurring at a frequency of about 800 megahertz (MHz). The bottom graph illustrates the regulated voltage (V$_{REG}$ 2004) output from the LDO regulator of about 1.8 V at a load current 500 μA and exhibiting resulting transients in V$_{REG}$ of less than about 116 nanovolts peak-to-peak (nVpp), yielding a PSSR of about 125 dB.

Figure 21:
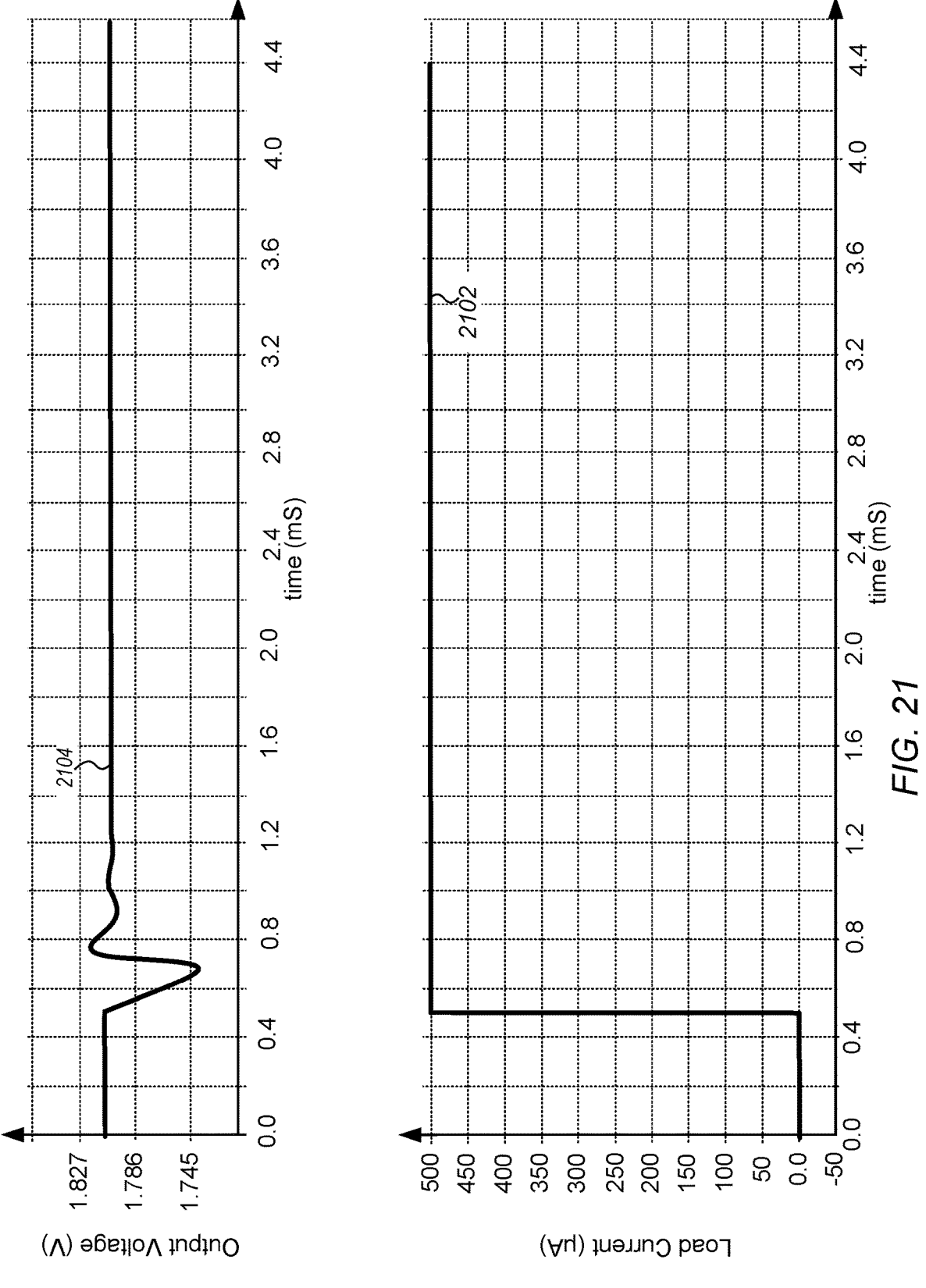
FIG. 21 are graphs of an increase in load current from 0 to 500 μA and a limited undershoot in an output voltage ($V_{REG}$) and response time for the LDO regulator of FIG. 14.

FIG. 21 are graphs of an increase in load current (I$_{load}$ 2102) from 0 to 500 μA and a limited undershoot in an output voltage (V$_{REG}$ 2104) and response time for the LDO regulator of FIG. 14. In particular, it is noted the output voltage (V$_{REG}$ 2104) shows an undershoot of less than about 50 mV.

Figure 22:
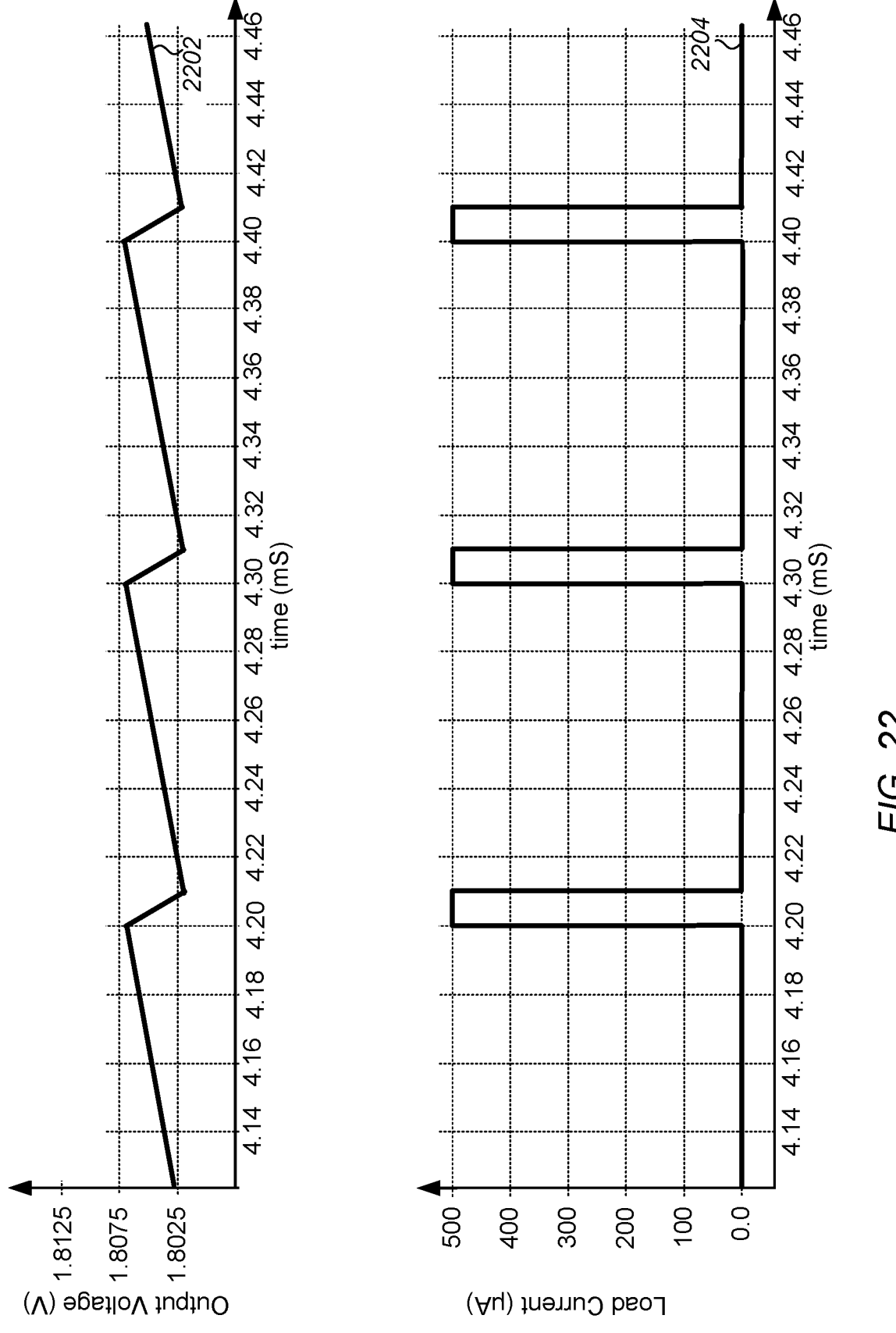
FIG. 22 are graphs output ripple in $V_{REG}$ caused by rapid, 500 μA 1 microsecond (μs) pulses in load current for the LDO regulator of FIG. 14.

FIG. 22 are graphs of output ripple in V$_{REG}$ 2202 from the LDO regulator of FIG. 14 caused by rapid, 500 μA, 1 microsecond (μs) pulses in load current (I$_{load}$ 2204) with 1 ns rise/fall time and recurring at a 100 us period. Referring to FIG. 22 it is seen that the LDO regulator is operable to provide a V$_{REG}$ 2202 of about 1.8 V with an output ripple of less than about 4.5 mVpp.

Figure 23:
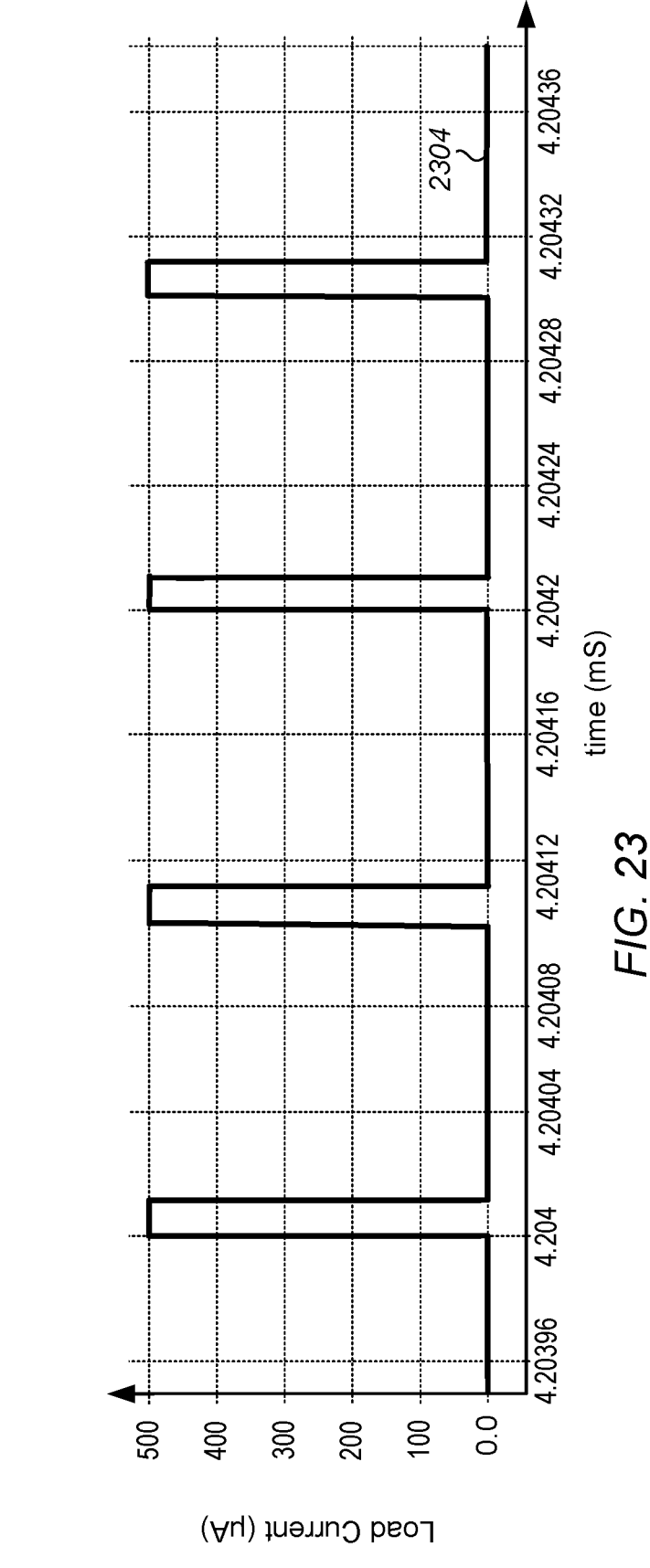
FIG. 23 are graphs output ripple in $V_{REG}$ caused by rapid, 500 μA 1 nanosecond (ns) pulses in load current for the LDO regulator of FIG. 14.

FIG. 23 are graphs of output ripple in V$_{REG}$ 2302 from the LDO regulator of FIG. 14 caused by rapid, 500 μA, 1 nanosecond (ns) pulses in load current (I$_{load}$ 2304) with 1 ns rise/fall time and recurring at a 100 us period. Referring to FIG. 23 it is seen that the LDO regulator is operable to provide a V$_{REG}$ 2302 of about 1.8 V with an output ripple of less than about 4.8 mVpp.

Referring to FIG. 24, the method generally begins with generating a floating-rail reference voltage (V$_{SSHV\_REF}$) equal to an input V$_{BAT}$ minus 1.8 V for V$_{BAT}$ between 1.8 V, and 4.8 V, and a V$_{SSHV}$ REF equal to 0 V for V$_{BAT}$ less than 1.8 V; and generating a fixed-rail reference voltage (V$_{DD\_REF}$) (step 2402). Next, V$_{SSHV\_REF}$ is coupled to a current-sinking (I-sink) buffer and using the I-sink buffer generating and coupling a floating-rail voltage (V$_{SSHV}$) to a floating-rail to power and logic devices integrally formed on an integrated circuit (IC) chip with the switching regulator (step 2404). The V$_{SSHV}$ is then coupled to a gate of a high-side switching transistor including a source and a drain coupled between V$_{BAT}$ and through a load to ground (step 2406). Next, V$_{DD\_REF}$ is coupled to a first low drop out (LDO) regulator, and using the first LDO regulator generating and coupling a regulated voltage (V$_{REG}$) to a fixed-rail to provide power to digital devices using a fixed voltage and integrally formed on the IC chip (step 2408).

Generally, the method further includes sinking a transient current in the floating-rail using a fast-transient current-sink by turning on a current sinking switch coupled between the floating-rail and ground by setting a latch in response to a signal from the load, and resetting the latch to turn off the current sinking switch after a result of a comparison of V$_{SSHV}$ and V$_{SSHV\_REF}$ using a comparator is less than a predetermined voltage (step 2410). Optionally, the method further includes coupling a reference voltage (V$_{BG\_REF}$) from the bandgap reference generator to the second LDO regulator, and using the second LDO regulator generating and coupling an output voltage ($V_{OUT}$) to provide power to analog devices integrally formed on the IC with the switching regulator (step 2412).

Figure 25:
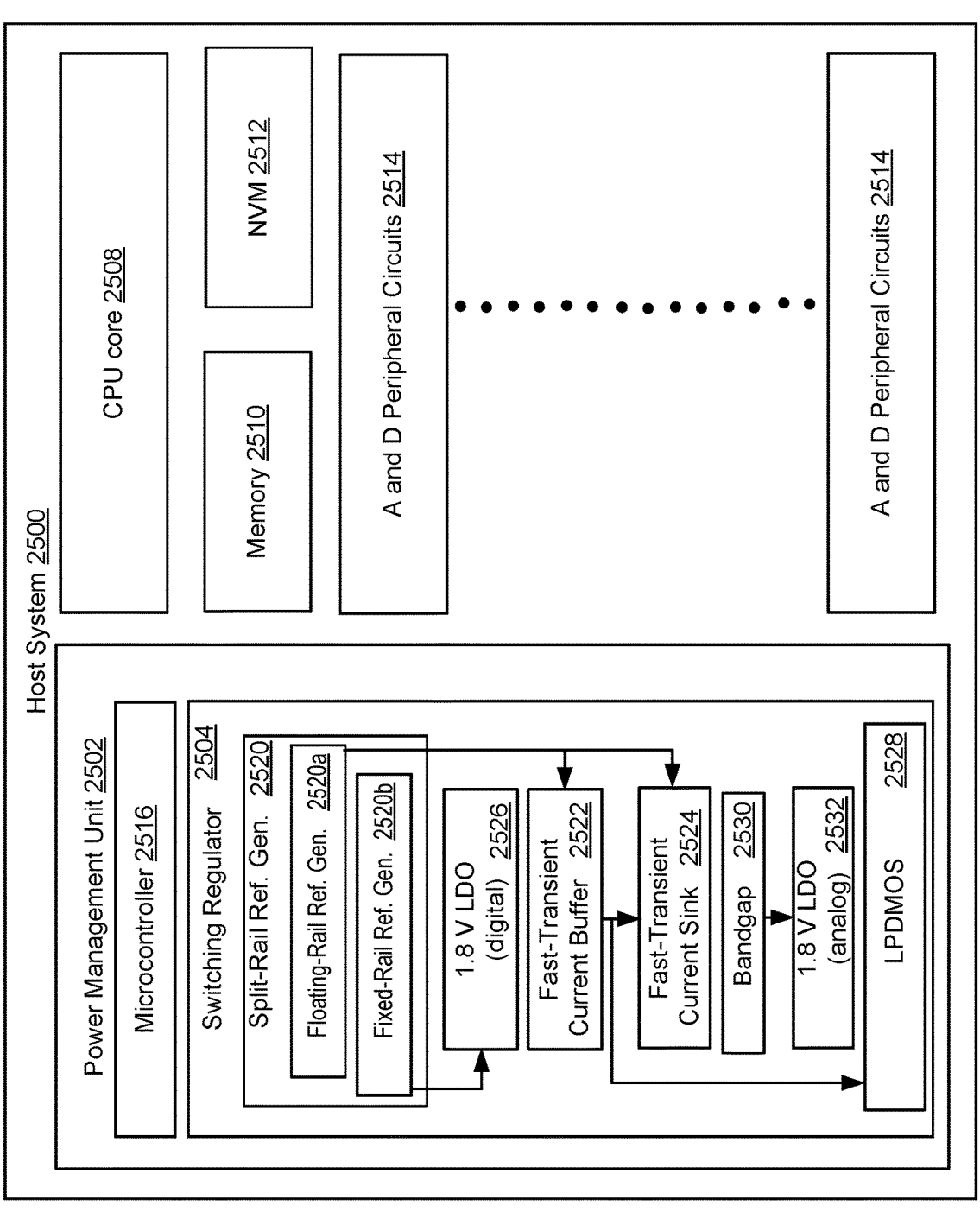
FIG. 25 is block diagram of a host system having a power management unit (PMU) with a switching regulator (SR) with a low-power, single-rail architecture.

FIG. 25 is block diagram of a host system 2500 having a power management unit (PMU 2502) including a switching regulator (SR 2504) with a low-power, single-rail architecture of the present disclosure. Referring to FIG. 25, the host system 2500 is generally a microcontroller unit (MCU) and can include a CPU core 2508, volatile memory 2510 and non-volatile memory (NVM 2512), and a number of configurable integrated analog and digital peripheral circuits 2514. Such MCUs are widely used in many automotive, and portable or non-portable electronic applications. Exemplary applications can include Bluetooth radios, and Wi-Fi hubs or receivers. The PMU can include, in addition to the SR 2504, a microcontroller 2516 that controls the SR 2504 and governs power functions of host system 2500.

The SR 2504 is operable to convert a voltage from a battery or other DC power source into output voltages required by other subsystems and devices in the host system 2500. The SR 2504 generally includes a split-rail reference generator 2520 with a floating-rail generator 2520a and a fixed-rail generator 2520b, a fast-transient current sink buffer 2522, a fast-transient current sink 2524, at least a first LDO regulator 2526, and a high-side switching transistor, such as a laterally-diffused PMOS transistor (LDPMOS 2528). The floating-rail reference generator 2520a generates a floating-rail reference voltage ($V_{SSHV\_REF}$) which is coupled to the current sink buffer 2522, and the fast-transient current sink 2524. The current sink buffer 2522 generates a floating-rail voltage ($V_{SSHV}$), which is coupled to a floating rail and used to power logic MOS devices integrally formed on an integrated circuit (IC) chip with the host system 2500, and to a gate of the LDPMOS 2528 to control the LDPMOS to supply the required output voltages. The fast-transient current sink 2524, which is also coupled to the floating-rail, is a dynamically biased current-sink and operates as described above to sink larger transients in a load current on the floating-rail. The first LDO regulator 2526 is operable to receive fixed-rail reference voltage ($V_{DD\_REF}$) from the fixed-rail generator 2520b, and generate a regulated voltage ($V_{REG}$) on a fixed-rail (not shown in this figure) to provide power to other digital devices in the host system 2500 requiring a fixed voltage.

In some embodiments, such as that shown in FIG. 25, the SR 2504 further includes a bandgap reference generator 2530 and a second LDO regulator 2532 operable to receive a bandgap reference voltage ($V_{BG\_REF}$) from the bandgap reference generator and generate an output voltage ($V_{OUT}$) to provide power to analog devices integrally formed on the IC with the host system 2500 and requiring a fixed voltage.

Thus, a PMU or SR including a low-power, switching regulator with a single-rail architecture and methods of operating the same have been disclosed. Embodiments of the present invention have been described above with the aid of functional and schematic block diagrams illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention.

It is to be understood that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A switching regulator comprising:
   a split-rail reference generator coupled between a battery voltage ($V_{BAT}$) and ground, the split-rail reference generator including:
      a floating-rail generator operable to generate a floating-rail reference voltage ($V_{SSHV\_REF}$); and
      a constant-rail reference generator operable to generate a fixed-rail reference voltage ($V_{DD\_REF}$);
   a current-sinking (I-sink) buffer coupled between $V_{BAT}$ and ground, the I-sink buffer operable to receive the $V_{SSHV\_REF}$ and generate a floating-rail voltage ($V_{SSHV}$) on a floating-rail to power logic devices using $V_{SSHV}$ and integrally formed on an integrated circuit (IC) chip with the switching regulator; and
   a high-side switching transistor including a source and a drain coupled between $V_{BAT}$ and ground, and a gate coupled to the floating-rail,
   wherein the floating-rail reference generator is operable to generate a $V_{SSHV\_REF}$ equal to $V_{BAT}$–1.8 V for $V_{BAT}$ between 1.8 V and 4.8 V, and a $V_{SSHV\_REF}$ equal to 0 V for $V_{BAT}$ less than 1.8 V.

2. The switching regulator of claim 1 further comprising a first low drop out (LDO) regulator coupled between $V_{BAT}$ and ground, the first LDO regulator operable to receive $V_{DD\_REF}$ and generate a regulated voltage ($V_{REG}$) on a fixed-rail to provide power to digital devices using a fixed voltage and integrally formed on the IC chip.

3. The switching regulator of claim 2 wherein the first LDO regulator comprises a one-stage differential amplifier with a direct feed-forward (DFF) loop that is predominant when the first LDO regulator is subject to a fast load transient, and an indirect regulation feedback (IRF) loop operative to provide DC voltage regulation under non-transient load conditions.

4. The switching regulator of claim 3 wherein the one-stage differential amplifier comprises:
   a NMOS differential pair, including:
      a first transistor having a source coupled through a first current source ($I_1$) to ground, a drain coupled through a second current source ($I_2$) to $V_{BAT}$, and a gate coupled to the constant-rail reference generator to receive $V_{DD\_REF}$ and operable as a non-inverting input of the one-stage differential amplifier; and
      a diode connected second transistor having a source coupled through $I_1$ to ground, a drain coupled through a resistor to an output of the one-stage differential amplifier, and a gate coupled to the drain of the second transistor and operable as a inverting input of the one-stage differential amplifier; and a PMOS transistor having a source coupled to $V_{BAT}$, a drain coupled to the output of the one-stage differential amplifier, and a gate coupled to the drain of the first transistor, wherein the DFF loop is formed by the PMOS transistor, a parasitic gate-to-drain capacitance ($C_{GD}$) of the PMOS transistor and a parasitic gate-to-source capacitance ($C_{GS}$) of the PMOS transistor during a fast load transient, and wherein the IRF loop is formed by the NMOS differential pair, the resistor (R) and the PMOS transistor under non-transient load conditions.

5. The switching regulator of claim 2 further comprising a fast-transient current-sink coupled between $V_{BAT}$ and ground, and to the floating-rail, the fast-transient current-sink operable to receive $V_{SSHV\_REF}$ and to charge and discharge the high-side switching transistor, to provide a stable floating-rail voltage ($V_{SSHV}$) on the floating-rail.

6. The switching regulator of claim 5 wherein the fast-transient current-sink is a dynamically-biased fast-transient current-sink comprising:

a latch system operable to receive a signal indicating a transient load current in a load current of the gate of the high-side switching transistor, and a latch system output, the latch system comprising:

a comparator having a non-inverting input coupled to $V_{SSHV\_REF}$, and an inverting input coupled to $V_{SSHV}$ on the floating-rail, and a comparator output; and a set-reset (S-R) latch having a set input coupled to and operable to receive the transient load current signal, a reset input coupled to the comparator output, and a latch output coupled to the latch system output;

a current sinking switch including a gate coupled to the latch system output, a first source/drain (S/D) terminal coupled to the floating-rail, and a second S/D terminal coupled to ground, the current sinking switch operable to sink at least a portion of the transient load current; and a dynamic biasing circuit coupled between the latch output and biasing voltage inputs to the comparator, the dynamic biasing circuit operable to receive a bias enable signal from the latch output and bias the comparator to increase an output therefrom to reset the S-R latch.

7. The switching regulator of claim 2 further comprising a bandgap reference generator and a second LDO regulator coupled between $V_{BAT}$ and ground, the second LDO regulator operable to receive a bandgap reference voltage ($V_{BG\_REF}$) and generate an output voltage ($V_{OUT}$) to provide power to analog devices integrally formed on the IC with the switching regulator.

8. A switching regulator comprising a low drop out (LDO) regulator coupled between a battery voltage ($V_{BAT}$) and ground, the LDO regulator operable to receive a reference voltage ($V_{REF}$) and generate and couple a regulated voltage ($V_{REG}$) to a fixed-rail to provide power to devices using a fixed voltage and integrally formed on an integrated circuit (IC) chip, wherein the LDO regulator comprises a one-stage differential amplifier with a direct feed-forward (DFF) loop that is predominant when the LDO regulator is subject to a fast load transient, and an indirect regulation feedback (IRF) loop operative to provide DC voltage regulation under non-transient load conditions, wherein the one-stage differential amplifier comprises:

a NMOS differential pair, including:

a first transistor having a source coupled through a first current source ($I_1$) to ground, a drain coupled through a second current source ($I_2$) to $V_{BAT}$, and a gate coupled to a reference voltage generator in the switching regulator to receive $V_{REF}$ and operable as a non-inverting input of the one-stage differential amplifier; and a diode connected second transistor having a source coupled through $I_1$ to ground, a drain coupled through a resistor to an output of the one-stage differential amplifier, and a gate coupled to the drain of the second transistor and operable as a inverting input of the one-stage differential amplifier; and a PMOS transistor having a source coupled to $V_{BAT}$, a drain coupled to the output of the one-stage differential amplifier, and a gate coupled to the drain of the first transistor, wherein the DFF loop is formed by the PMOS transistor, a parasitic gate-to-drain capacitance ($C_{GD}$) of the PMOS transistor and a parasitic gate-to-source capacitance ($C_{GS}$) of the PMOS transistor during a fast load transient.

9. The switching regulator of claim 8 wherein the IRF loop is formed by the NMOS differential pair, the resistor (R) and the PMOS transistor under non-transient load conditions.

10. The switching regulator of claim 8 further comprising a capacitor integrally formed on the IC chip and coupled between the output of the of the one-stage differential amplifier and ground, the capacitor operable to stabilize the $V_{REG}$ to the fixed-rail.

11. The switching regulator of claim 8 wherein the reference voltage generator comprises a split-rail reference generator including a constant-rail reference generator operable to generate a fixed-rail reference voltage ($V_{DD\_REF}$), and wherein the devices using the fixed voltage comprise digital devices.

12. The switching regulator of claim 8 wherein the reference voltage generator comprises a bandgap reference generator operable to generate a bandgap reference voltage ($V_{BG\_REF}$), and wherein the devices using the fixed voltage comprise analog devices.

13. A method of operating a switching regulator comprising:

using a split-rail reference generator coupled between a battery voltage ($V_{BAT}$) and ground:

generating a floating-rail reference voltage ($V_{SSHV\_REF}$) equal to an input $V_{BAT}$ minus 1.8 V for $V_{BAT}$ between 1.8 V, and 4.8 V, and a $V_{SSHV\_REF}$ equal to 0 V for $V_{BAT}$ less than 1.8 V; and generating a fixed-rail reference voltage ($V_{DD\_REF}$);

coupling $V_{SSHV\_REF}$ to a current-sinking (I-sink) buffer and using the I-sink buffer generating and coupling a floating-rail voltage ($V_{SSHV}$) to a floating-rail to power and logic devices integrally formed on an integrated circuit (IC) chip with the switching regulator; and coupling $V_{SSHV}$ to a gate of a high-side switching transistor including a source and a drain coupled between $V_{BAT}$ and through a load to ground.

14. The method of claim 13 wherein further comprising coupling $V_{DD\_REF}$ to a first low drop out (LDO) regulator, and using the first LDO regulator generating and coupling a regulated voltage ($V_{REG}$) to a fixed-rail to provide power to digital devices using a fixed voltage and integrally formed on the IC chip.

15. The method of claim 14 wherein the first LDO regulator comprises a one-stage differential amplifier with a direct feed-forward (DFF) loop and an indirect regulation feedback (IRF) loop, and wherein the DFF loop is predominant when the first LDO regulator is subject to a fast load transient, and the IRF loop is operative to provide DC voltage regulation under non-transient load conditions.

16. The method of claim 14 further comprising sinking a transient current in the floating-rail using a fast-transient current-sink by turning on a current sinking switch coupled between the floating-rail and ground by setting a latch in response to a signal from the load, and resetting the latch to turn off the current sinking switch after a result of a comparison of $V_{SSHV}$ and $V_{SSHV\_REF}$ using a comparator is less than a predetermined voltage.

17. The method of claim 16 wherein the fast-transient current-sink is a dynamically-biased fast-transient current-sink, and wherein turning on a current sinking switch comprises biasing the comparator to provide a set input to the latch in response to the signal from the load, and further comprising reducing biasing to the comparator when the result of the comparison of $V_{SSHV}$ and $V_{SSHV\_REF}$ is less than the predetermined voltage to reduce power consumption of the dynamically-biased fast-transient current-sink.

18. The method of claim 14 wherein switching regulator further comprises a bandgap reference generator and a second LDO regulator, and wherein the method further comprises coupling a reference voltage ($V_{BG\_REF}$) from the bandgap reference generator to the second LDO regulator, and using the second LDO regulator generating and coupling an output voltage ($V_{OUT}$) to provide power to analog devices integrally formed on the IC with the switching regulator.

* * * * *